US011142261B2

(12) United States Patent
Nakauchi et al.

(10) Patent No.: US 11,142,261 B2
(45) Date of Patent: Oct. 12, 2021

(54) LOWER VEHICLE-BODY STRUCTURE OF VEHICLE

(71) Applicant: MAZDA MOTOR CORPORATION, Hiroshima (JP)

(72) Inventors: Shigeru Nakauchi, Hiroshima (JP); Masanobu Hanazaki, Hiroshima (JP); Toshio Kimura, Hiroshima (JP); Sho Kurokawa, Hiroshima (JP); Kinya Sakaguchi, Hiroshima (JP); Kouki Sato, Kure (JP); Yosuke Yabumoto, Hiroshima (JP); Hiroshi Matsubara, Hiroshima (JP); Yohei Izumi, Hatsukaichi (JP); Kentaro Nomura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 179 days.

(21) Appl. No.: 16/448,489

(22) Filed: Jun. 21, 2019

(65) Prior Publication Data

US 2019/0389515 A1    Dec. 26, 2019

(30) Foreign Application Priority Data

Jun. 26, 2018   (JP) .............................. JP2018-120765
Sep. 7, 2018    (JP) .............................. JP2018-167543

(51) Int. Cl.
*B62D 25/20* (2006.01)
*B60G 99/00* (2010.01)

(52) U.S. Cl.
CPC ....... *B62D 25/2036* (2013.01); *B60G 99/002* (2013.01); *B62D 25/2018* (2013.01); *B62D 25/2027* (2013.01)

(58) Field of Classification Search
CPC ............ B62D 25/2036; B62D 25/2027; B60G 99/002; B60G 7/008; B60G 7/02
(Continued)

(56) References Cited

U.S. PATENT DOCUMENTS

| 7,575,243 | B2 * | 8/2009 | Takahashi | ................ B60G 7/02 |
| | | | | 280/124.11 |
| 2008/0048409 | A1 * | 2/2008 | Takahashi | .............. B62D 25/08 |
| | | | | 280/124.116 |

(Continued)

FOREIGN PATENT DOCUMENTS

| JP | H07-164845 A | 6/1995 |
| JP | 2007-276623 A | 10/2007 |

(Continued)

OTHER PUBLICATIONS

The extended European search report issued by the European Patent Office on Nov. 8, 2019, which corresponds to EP19181102.5-1013 and is related to U.S. Appl. No. 16/448,489.

*Primary Examiner* — Jason S Morrow
(74) *Attorney, Agent, or Firm* — Studebaker & Brackett PC

(57) ABSTRACT

The support stiffness of a suspension supporting portion can be improved to reduce floor vibration. Arm front-end supporting portions, each supporting a front end portion of a trailing of a rear suspension, are formed on lower portions of rear frames extending in a vehicle longitudinal direction, and each include a squared U-shape portion including outer, inner and front wall portions, with a rear side being open when viewed from the bottom, and an extending outer wall portion extending from the outer wall portion to in front of the front wall portion. The outer wall portion and extending outer wall portion are formed by a side sill inner portion joined to each rear side frame. Also, each arm front-end supporting portion includes an extending inner wall portion (Continued)

extending from the inner wall portion to in front of the front wall portion and joined to each of the rear side frames.

19 Claims, 13 Drawing Sheets

(58) Field of Classification Search
USPC .............................. 296/193.08, 203.04, 204
See application file for complete search history.

(56) References Cited

U.S. PATENT DOCUMENTS

| | | | |
|---|---|---|---|
| 2009/0058144 A1* | 3/2009 | Park ...................... | B62D 21/07 |
| | | | 296/204 |
| 2019/0100065 A1* | 4/2019 | Hata ...................... | B62D 21/15 |
| 2019/0291789 A1* | 9/2019 | Nishida .................. | B60G 7/001 |
| 2020/0215868 A1* | 7/2020 | Kim ...................... | B60G 7/001 |
| 2020/0385058 A1* | 12/2020 | Kubota .............. | B62D 25/2027 |

FOREIGN PATENT DOCUMENTS

| | | |
|---|---|---|
| JP | 2007-283884 A | 11/2007 |
| JP | 2010-241176 A | 10/2010 |
| WO | 2015/037130 A1 | 3/2015 |
| WO | 2015/037444 A1 | 3/2015 |

\* cited by examiner

LOWER VEHICLE-BODY STRUCTURE OF VEHICLE

BACKGROUND

Technical Field

The present disclosure relates to a lower vehicle-body structure of a vehicle, in which a front end of an arm of a rear suspension, in particular, a torsion beam suspension is supported from a lower side of a rear floor forming a surface extending in the vehicle longitudinal direction and the vehicle width direction.

Background Art

As a structure that supports the front end of the arm of the rear suspension, in particular, the torsion beam suspension from a lower side of the rear suspension, a configuration including an arm supporting bracket (30) that supports the front end of the arm via a support mechanism (40) between left and right vertical surface portions (31) and (32) in a freely swingable manner is known as described, for example, in Japanese Patent Laid-Open No. 2007-283884).

The arm supporting bracket (30) is formed into a squared U-shape in which the rear side is open when viewed from the bottom by causing a reinforcement member (35) to serve as a bridge between the front ends of the vertical surface portions (31) and (32) in the vehicle width direction. By the configuration, the support stiffness, in particular, the lateral stiffness of the front end of the arm, that is, the stiffness against the vibration in the lateral direction (vehicle width direction) input to the vehicle body side from the arm via the arm supporting bracket (30) can be improved, and the improvement in the straight line stability while traveling can be expected.

Meanwhile, the vibration in the vehicle longitudinal direction and the vertical direction input from the arm via the arm supporting bracket (30) causes noise due to the vibration of the floor. Hitherto, the vibration has been responded to by placing a reinforcing bead and a patch to the vibrating portion, for example. However, it is conceived that it is more preferred to reduce the vibration input amount itself in the arm supporting bracket (30) that is close to the vibration input point to the vehicle body also for the vibration in the vehicle longitudinal direction and the vertical direction as with the vibration in the lateral direction.

In Japanese Patent Laid-Open No. 2007-283884, an idea as above is not described, and there is room for improvement in terms of reducing the floor vibration by particularly reducing the vibration input amount in the vehicle longitudinal direction and the vertical direction out of the vibration input from the vibration input point to the vehicle body in addition to further improving the support stiffness of the suspension supporting portion.

The present disclosure has been made in view of the problem as above, and an object thereof is to provide a lower vehicle-body structure of a vehicle capable of improving the support stiffness of a suspension supporting portion and contributing to the reduction of floor vibration.

SUMMARY

The present disclosure provides a lower vehicle-body structure of a vehicle, the lower vehicle-body structure including left and right rear frames forming a closed cross section extending in a vehicle longitudinal direction; and arm front-end supporting portions that are on lower portions of the rear frames and are for supporting left and right trailing arm front ends of a rear suspension. The arm front-end supporting portions each have a squared U-shape portion including an outer wall portion on an outer side in a vehicle width direction, an inner wall portion on an inner side in the vehicle width direction, and a front wall portion with a rear side being open when viewed from bottom. In the lower vehicle-body structure of a vehicle, each of the arm front-end supporting portions includes an extending outer wall portion extending from the outer wall portion to a place in front of the front wall portion, the outer wall portion and the extending outer wall portion being formed by a side sill inner portion joined to each of the rear frames, and an extending inner wall portion extending from the inner wall portion to a place in front of the front wall portion, with the extending inner wall portion being joined to each of the rear frames.

According to the configuration described above, the support stiffness of the arm front-end supporting portion (suspension supporting portion) can be improved. As a result, the vibration (load) in the arm front-end supporting portion serving as the input source of the vibration (load) input to the vehicle body from the rear wheels via the rear suspension can be reduced, thereby being able to contribute to the reduction of the floor vibration.

As an aspect of the present disclosure, the inner wall portion is formed by a first gusset member, the front wall portion is formed by a second gusset member, and the first gusset member is integrally molded so as to include the extending inner wall portion.

According to the configuration described above, the support stiffness of the arm front-end supporting portion in the vehicle longitudinal direction can be improved more.

As an aspect of the present disclosure, a first gusset reinforcing bead is formed from the inner wall portion of the first gusset member to the extending inner wall portion.

According to the configuration described above, the stiffness between the inner wall portion and the extending inner wall portion in the first gusset member can be improved.

As an aspect of the present disclosure, the lower vehicle-body structure further includes a first gusset reinforcement flange portion bendable outward in the vehicle width direction from the inner wall portion to the extending inner wall portion on a lower end of the first gusset member.

According to the configuration described above, the stiffness of the first gusset member can be improved by including the first gusset reinforcement flange portion from the inner wall portion to the extending inner wall portion on the lower end of the first gusset member.

As an aspect of the present disclosure, the extending inner wall portion is formed by a gusset member formed by a member different from the inner wall portion.

According to the configuration described above, by the gusset member and the extending outer wall portion formed by the side sill inner portion, the support stiffness of the arm front-end supporting portion (suspension supporting portion) can be improved, and the floor vibration can be effectively reduced by the reduction of the vibration input amount to the vehicle body from the vibration input source particularly in the vehicle vertical direction and the vehicle longitudinal direction.

As an aspect of the present disclosure, the gusset member includes: an inner-wall extending portion extending frontward from the inner wall portion; and a front-wall extending portion that extends frontward from the front wall portion and is continuous with the inner-wall extending portion via a ridgeline.

According to the configuration described above, the stiffness of the entire gusset member can be improved by forming the gusset member in a shape including the ridgeline.

As an aspect of the present disclosure, the gusset member includes a reinforcement flange portion bendable downward from an outer end of the front-wall extending portion in the vehicle width direction.

According to the configuration described above, the stiffness of the front-wall extending portion can be improved by forming the reinforcement flange portion bendable downward from the outer end of the front-wall extending portion in the front-wall extending portion of the gusset member.

As an aspect of the present disclosure, the gusset member includes, on the inner-wall extending portion, a reinforcing bead extending from the inner wall portion to a joining portion to the rear frame.

According to the configuration described above, the stiffness of the inner-wall extending portion can be improved by forming the inner-wall extending portion of the gusset member to include the reinforcing bead.

As an aspect of the present disclosure, the lower vehicle-body structure further includes a rear frame reinforcement in the rear frame. The rear frame reinforcement is formed by: a reinforcement lower-wall inner-side portion arranged on an inner side of a lower wall of the rear frame in the vehicle width direction; and a reinforcement inner-wall lower-side portion arranged on a lower portion of the inner wall portion. The inner-wall extending portion and the reinforcement inner-wall lower-side portion are joined to each other so as to sandwich the rear frame therebetween, and the front-wall extending portion and the reinforcement lower-wall inner-side portion are joined to each other so as to sandwich the rear frame therebetween.

According to the configuration described above, the stiffness of the joining portion between the gusset member and the rear frame can be improved by the rear frame reinforcement.

As an aspect of the present disclosure, the lower vehicle-body structure further includes a joint member in the rear frame, the joint member being at a position close to a front portion of the gusset member.

According to the configuration described above, the place between the gusset member and the side sill can be reinforced by the joint member.

According to the present disclosure, the support stiffness of the suspension supporting portion can be improved, thereby contributing to the reduction of the floor vibration.

DETAILED DESCRIPTION

Figure 1:
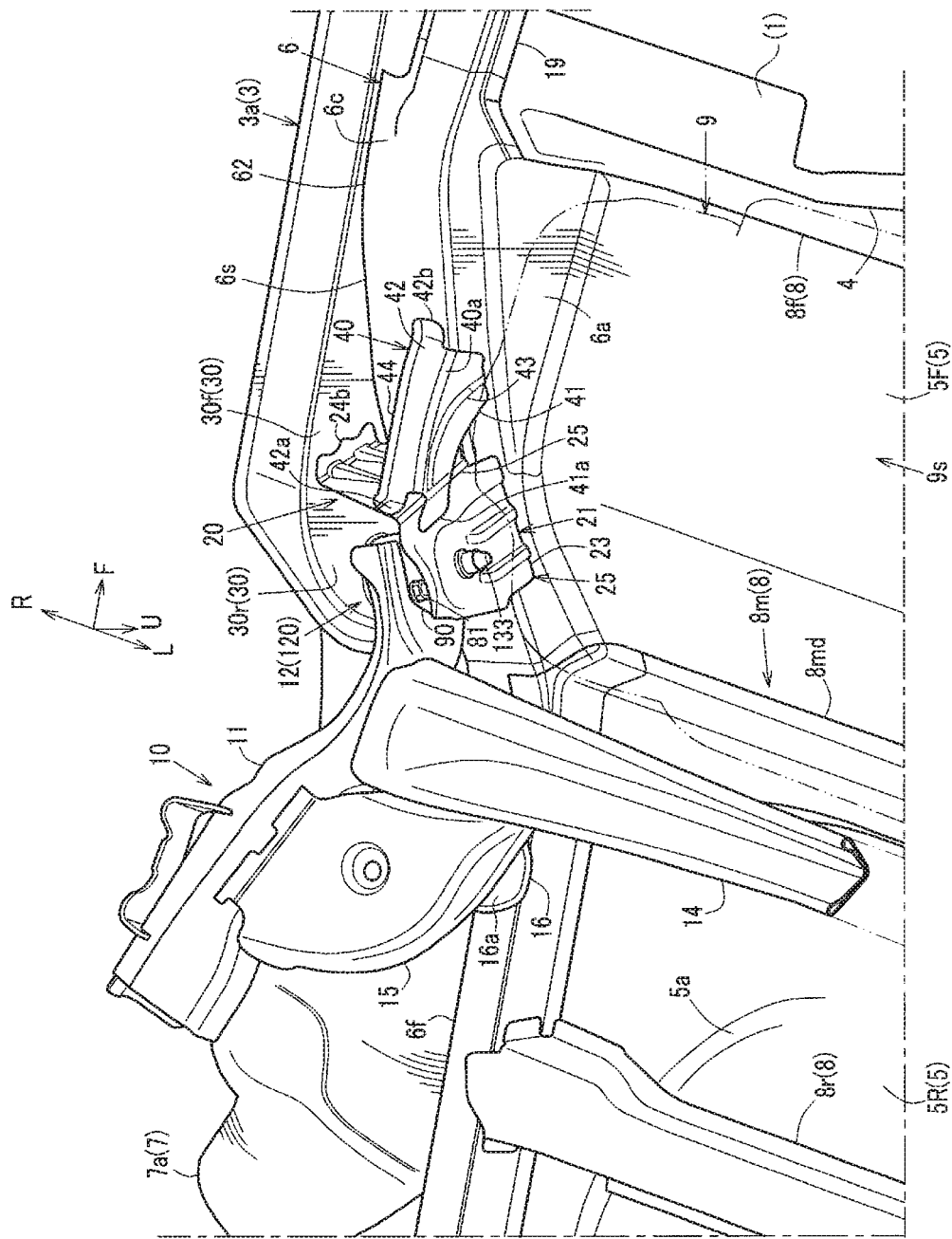
FIG. 1 is a perspective view illustrating the main part of a lower vehicle-body structure on the right side of a vehicle of an embodiment of the present disclosure viewed from below and the center side in the vehicle width direction.

The embodiments of the present disclosure are described in detail below with reference to the drawings.

In the drawings, arrow F indicates the front side of the vehicle, arrow R indicates the right side of the vehicle, arrow L indicates the left side of the vehicle, and arrow U indicates the upper side of the vehicle. In addition, the illustration of a rear suspension and a rear wheel house is omitted for the left side of the vehicle in FIG. 2, and the vehicle-width inner wall portions of a rear frame upper portion and a rear frame lower portion are illustrated with virtual lines in FIG. 4 and FIG. 12. In addition, the "x" mark in the drawings indicates the spot welding position. Further, the lower vehicle-body structure of the vehicle of this embodiment has a symmetrical shape, and hence description is made on the basis of the configuration on the right side of the vehicle unless otherwise indicated in particular.

In the lower vehicle-body structure of the vehicle of this embodiment, a floor panel 1 (see FIG. 2) forming the floor surface of the interior of the vehicle is provided, and a tunnel portion 2 (see the same figure) protruding into the interior of the vehicle and extending in the vehicle longitudinal direction is integrally formed on the substantially central portion of the floor panel 1 in the vehicle width direction.

Figure 2:
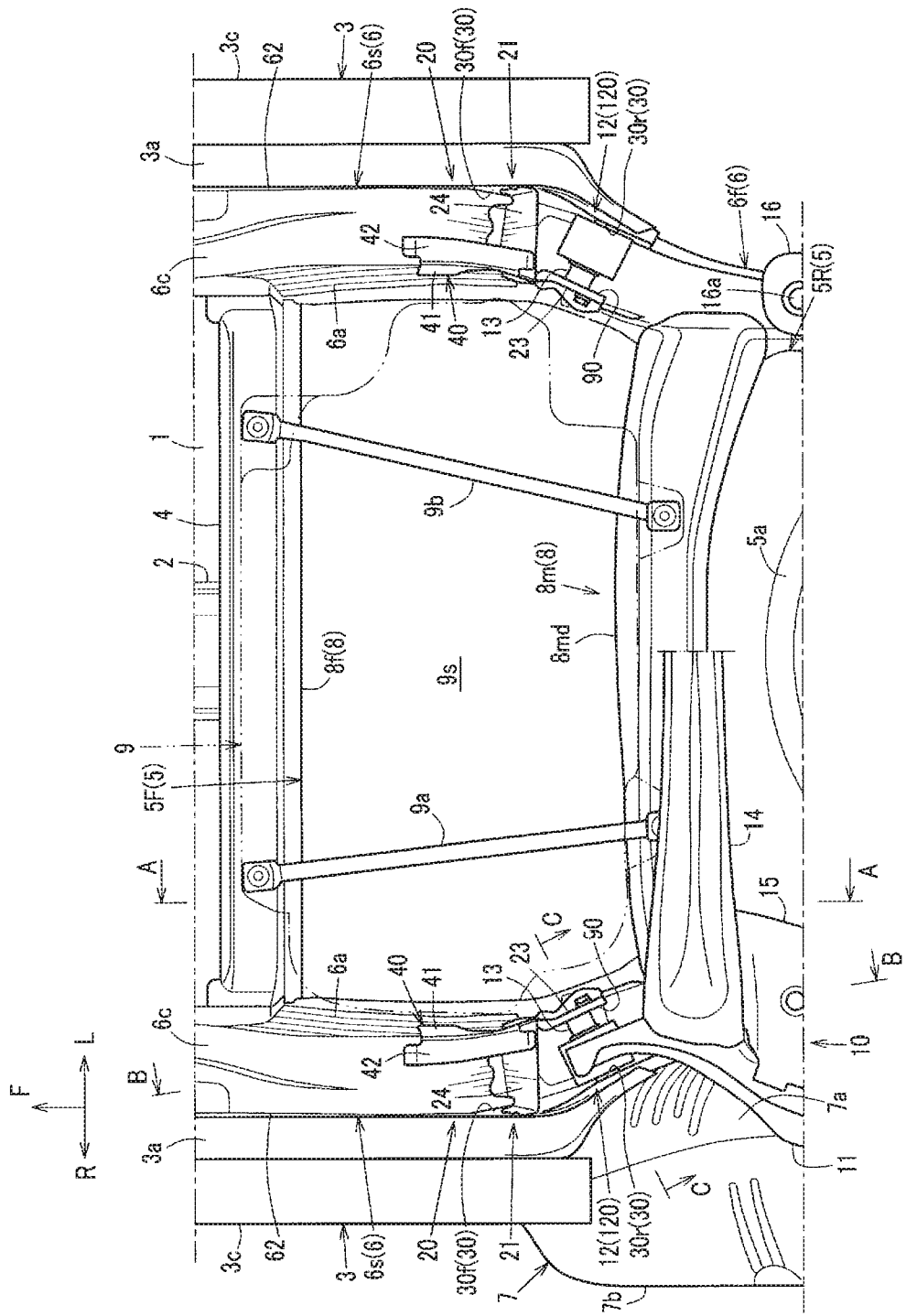
FIG. 2 is a bottom view illustrating the main part of the lower vehicle-body structure of this embodiment.

As illustrated in FIG. 1 and FIG. 2, side sills 3 serving as vehicle body strength members are fixed on both sides of the floor panel 1 by joining. As illustrated in, for example, FIG. 7A that illustrates an orthogonal cross section of the side sill 3 with respect to the vehicle longitudinal direction, the side sill 3 has a closed cross section that extends in the vehicle longitudinal direction and includes a side sill inner portion 3a and a side sill reinforcement 3b. Further, a side sill outer member 3c serving as a design panel forming a part of the body side is joined to the side sill reinforcement 3b from the outer side in the vehicle width direction.

In addition, a pair of left and right floor frames 19 extending in the vehicle longitudinal direction is fixed to the lower surface of the floor panel 1 between the tunnel portion 2 and the side sill 3 by joining.

As illustrated in FIG. 1 and FIG. 2, a rear floor panel 5 forming the floor on the rear portion of the vehicle body is integrally provided on the rear portion of the floor panel 1 described above in a consecutive manner via a kick-up portion 4 rising upward, and rear side frames 6 extending in the vehicle longitudinal direction are provided on both sides of the rear floor panel 5.

A front portion 5F (hereinafter referred to as a "rear floor front portion 5F") of the rear floor panel 5 forms the bottom surface of the rear seat. Meanwhile, as illustrated in FIG. 1 and FIG. 2, a rear portion 5R (hereinafter referred to as a "rear floor rear portion 5R") of the rear floor panel 5 forms a the trunk floor, and a recessed portion 5a serving as other parts or a spare tire pan recessed downward are integrally formed in the middle portion thereof in the vehicle width direction.

As illustrated in FIG. 1 and FIG. 2, a rear cross member 8 serving as a bridge between the pair of left and right rear side frames 6 in the vehicle width direction is arranged on each of the upper and lower sides of the rear floor panel 5.

In detail, a front-side rear cross member 8f that extends in the vehicle width direction and connects the rear side frames 6 on both sides in the vehicle width direction is fixed to the front portion of the rear floor front portion 5F from the lower surface side of the rear floor front portion 5F by joining.

On the boundary between the rear floor front portion 5F and the rear floor rear portion 5R and on both upper and lower portions of the rear floor panel 5, a rear cross member upper portion (not shown) and a rear cross member lower portion 8md (see FIG. 1 and FIG. 2) are fixed by joining through spot welding and the like. Both of the rear cross member upper portion and the rear cross member lower portion 8md are middle rear cross members 8m (so-called No. 4 cross members) that extend in the vehicle width direction and connect the rear side frames 6 on both sides in the vehicle width direction. Closed cross sections overlapping in the vertical direction are formed between the rear cross member upper portion and the rear floor panel 5, and between the rear cross member lower portion 8md and the rear floor panel 5.

Further, as illustrated in FIG. 1, a rear-side rear cross member 8r (so-called No. 4.5 cross member) is fixed to the rear floor rear portion 5R by joining from the lower surface side of the rear floor rear portion 5R. The rear-side rear cross member 8r extends in the vehicle width direction so as to run across the recessed portion 5a of the rear floor rear portion 5R, and connects the rear side frames 6 on both sides in the vehicle width direction. A closed cross section extending in the vehicle width direction is formed between the rear-side rear cross member 8r and the rear floor panel 5.

As illustrated in FIG. 1 and FIG. 2, a rear wheel house 7 is provided on the outer side of the rear side frame 6 in the vehicle width direction (only the right side of the vehicle is shown). The rear wheel house 7 is formed by joining a rear wheel house outer portion 7b and a rear wheel house inner portion 7a to each other.

The rear portion of the side sill 3 extends so as to reach the front portion of the rear wheel house 7 that is arranged further behind the position corresponding to the rear end of the floor panel 1. Out of the rear portion of the side sill 3, rear ends of the side sill inner portion 3a and the side sill reinforcement 3b are joined to the front portion of the rear wheel house inner portion 7a.

That is, the rear portion of the side sill 3 and the rear wheel house 7 are arranged so as to be adjacent to the rear side frame 6 on the outer side of the rear side frame 6 in the vehicle width direction.

As illustrated in FIG. 4 to FIG. 6, FIG. 7A and FIG. 7B, and FIG. 8, the rear side frame 6 described above is formed as a vehicle-body side-portion stiffness member in which a closed cross section 60s extending in the vehicle longitudinal direction is formed on the inside from the kick-up portion 4 to the rear end of the rear floor panel 5, and includes a rear floor side panel 61 (also referred to as a "rear side frame upper portion 61"), a rear side frame lower portion 62 arranged below the rear floor side panel 61, and the like across the entire vehicle longitudinal direction.

The rear floor side panel 61 is a panel that forms the upper surface of the rear side frame 6 and forms both sides of the rear floor panel 5 (see FIG. 1).

As illustrated in FIG. 6, FIG. 7A and FIG. 7B, and FIG. 8, the rear side frame lower portion 62 is integrally formed by a vehicle-width inner wall portion (6a) that extends to the vertical direction while inclining toward the outer side in the vehicle width direction as the vehicle-width inner wall portion (6a) approaches downward on the inner side of the rear side frame 6 in the vehicle width direction, and a lower wall portion (6c) that substantially horizontality extends to the outer side in the vehicle width direction from a lower end portion of the vehicle-width inner wall portion (6a). The vehicle-width inner wall portion (6a) and the lower wall portion (6c) form a vehicle-width inner wall portion 6a and a lower wall portion 6c of the rear side frame 6, respectively.

Figure 6:
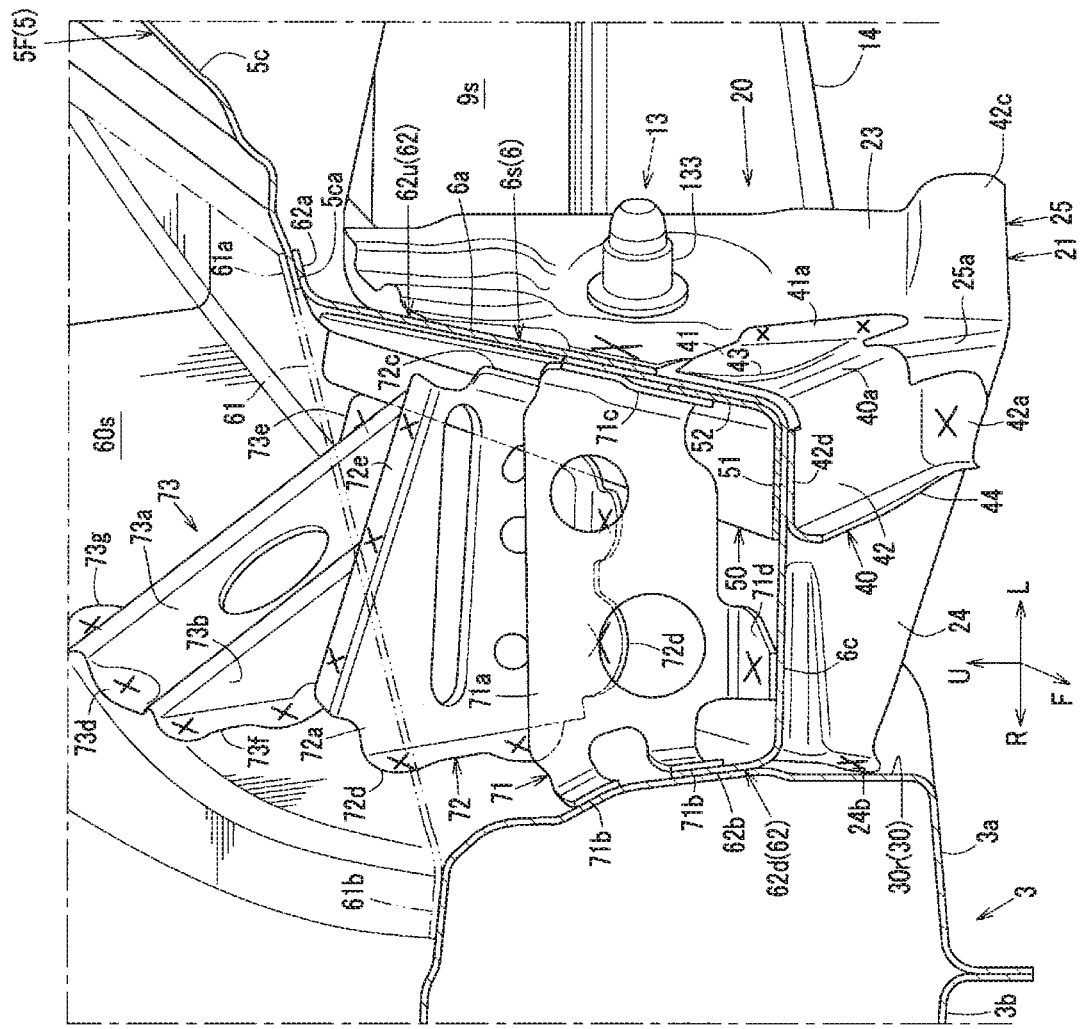
FIG. 6 is an arrow cross-sectional view taken along line D-D in FIG. 4.
Figure 7A:
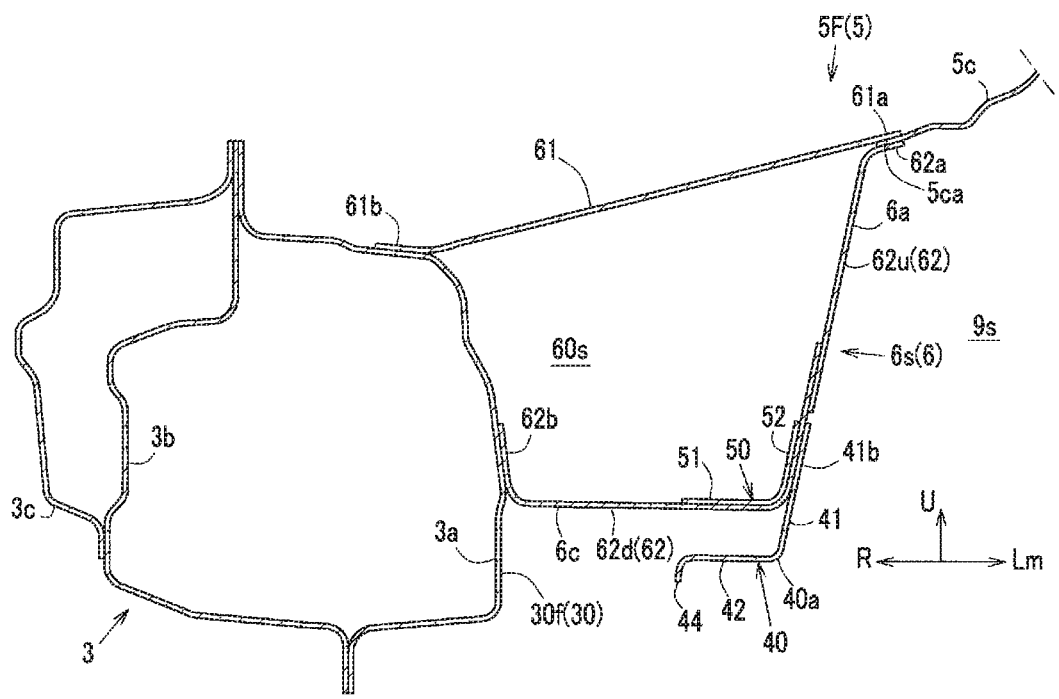
FIG. 7A is a cross-sectional view taken along line E-E in FIG. 4.
Figure 7B:
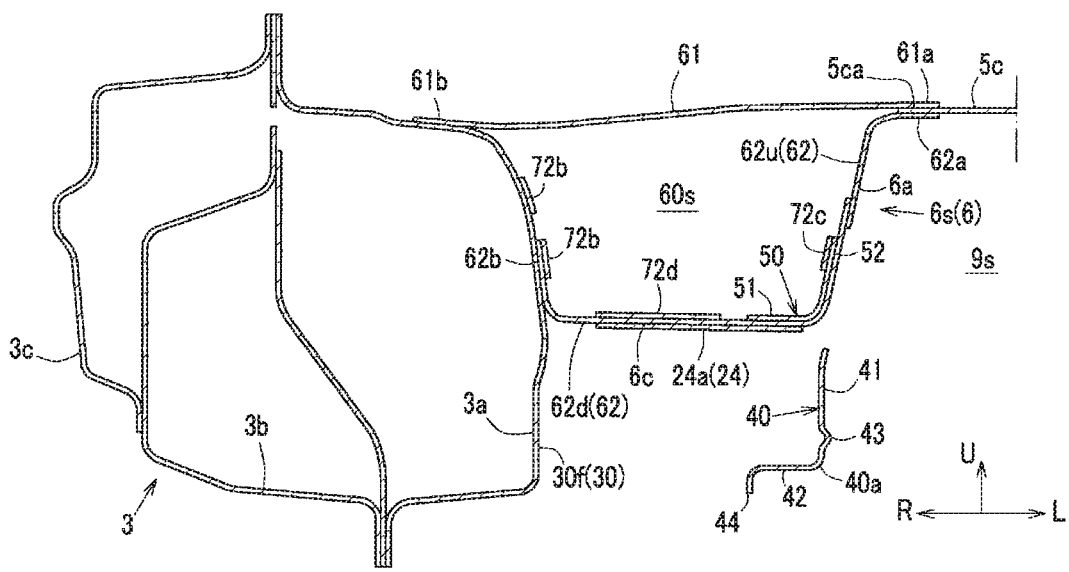
FIG. 7B is a cross-sectional view taken along line F-F in FIG. 4.

Note that, in this example, as illustrated in FIG. 6 and FIG. 7A and FIG. 7B, a part of the rear side frame lower portion 62 in the vehicle longitudinal direction is further formed by two members, that is, a rear side frame lower portion upper-side configuration member 62u and a rear side frame lower portion lower-side configuration member 62d. The vehicle-width inner wall portion 6a of the rear side frame 6 is formed by the rear side frame lower portion upper-side configuration member 62u and the vehicle-width inner wall portion of the rear side frame lower portion lower-side configuration member 62d.

On the rear floor side panel 61 and the rear side frame lower portion 62 described above, joining flange portions 61a and 62a are formed on the inner ends in the vehicle width direction (see FIG. 6, FIG. 7A and FIG. 7B, and FIG. 8). Triple joining is performed by spot welding and the like in a state in which an outer end 5ca in the vehicle width direction of a center portion 5c in the vehicle width direction of the rear floor panel 5 is sandwiched by the joining flange portions 61a and 62a (see the same figures). The outer end 5ca in the vehicle width direction is located in a portion on the inner side than the rear floor side panel 61 in the vehicle width direction.

Joining flange portions 61b and 62b are also formed on the outer ends of the rear floor side panel 61 and the rear side frame lower portion 62 in the vehicle width direction. The joining flange portions 61b and 62b are joined to the inner panel of the vehicle body part arranged on the outer side than the rear side frame 6 in the width direction.

In this example, the joining flange portions 61b and 62b are joined to the side sill inner portion 3a serving as the inner panel of the vehicle body part described above at sections of the rear side frame 6 corresponding to the side sill 3 in the vehicle longitudinal direction (see FIG. 7A and FIG. 7B), and are joined to the rear wheel house inner portion 7a serving as the inner panel of the vehicle body part described above at sections corresponding to the rear wheel house 7.

As a result, the rear side frame 6 forms the closed cross section 60s extending in the vehicle longitudinal direction between the rear floor side panel 61 and the rear side frame lower portion 62, and the inner panel described above of the vehicle body part arranged on the outer side in the width direction.

In addition, as illustrated in FIG. 1, a front end of the rear side frame 6 is joined to the rear end of the floor frame 19 described above that is fixed to the lower surface of the floor panel 1 by joining. As illustrated in FIG. 1 and FIG. 2, in the rear side frame 6, the front portion in the vehicle longitudinal direction thereof corresponding to the rear floor front portion 5F is formed as an inclination portion 6s that extends so as to incline upward as the inclination portion 6s approaches the rear side, and the rear portion corresponding to the rear floor rear portion 5R is formed as a linear portion 6f that substantially horizontality and linearly extends to the rear direction of the vehicle.

As illustrated in FIG. 1, the inclination portion 6s is inclined upward as the inclination portion 6s approaches the rear side from the front end thereof so as to correspond to the rising height of the kick-up portion 4.

As illustrated in FIG. 2, the rear wheel house 7 described above (only the right side of the vehicle is shown) is arranged from the rear portion of the inclination portion 6s to the linear portion 6f of the rear side frame 6 in the vehicle longitudinal direction, and is formed so as to bulge out to be pushed to the inner side in the vehicle width direction with respect to the front portion of the inclination portion 6s. In correspondence to the configuration above, the rear portion of the inclination portion 6s extends by inclining so as to circumvent the rear wheel house 7 to the inner side in the vehicle width direction, and the linear portion 6f linearly extends from the rear end of the inclination portion 6s as above to the rear side of the vehicle.

As illustrated in FIG. 1, the inclination portion 6s is formed so as to protrude downward as the inclination portion 6s approaches the front side with respect to the rear floor front portion 5F in accordance with the rear floor front portion 5F being arranged on the upper side with respect to the floor panel 1 via the kick-up portion 4. As a result, in the portion of the inclination portion 6s that is below the lower surface of the rear floor front portion 5F, the vehicle-width inner wall portion 6a of the inclination portion 6s is provided to protrude in a vertical wall shape with respect to the rear floor front portion 5F.

As a result, a space 9s surrounded by the inclination portions 6s of the pair of left and right rear side frames 6 protruding to a place below the lower surface of the rear floor front portion 5F, the front-side rear cross member 8f (kick-up portion 4), and the middle rear cross member 8m when viewed from the bottom of the vehicle is formed below the rear floor front portion 5F, and at least the upper portion of a fuel tank 9 is stored in the space 9s (see FIG. 2). The fuel tank 9 is supported on the vehicle body side with use of a pair of left and right tank bands 9a and 9b (see the same figure). In this example, the front portions of the tank bands 9a and 9b are fixed to the front-side rear cross member 8f by fastening, and the rear portions of the tank bands 9a and 9b are fixed to the middle rear cross member 8m by fastening.

Meanwhile, as illustrated in FIG. 1, the rear portion of the side sill 3 horizontally extends in the vehicle longitudinal direction so that the lower surface thereof is maintained at the substantially same height as the lower surface of the floor panel 1. As a result, as illustrated the same figure, the rear portion of the side sill 3 arranged so as to be adjacent to the inclination portion 6s on the outer side of the inclination portion 6s in the vehicle width direction is formed so as to protrude downward with respect to the lower surface of the inclination portion 6s that is inclined upward as the inclination portion 6s approaches the rear side. A vehicle-width inner wall portion 30 (hereinafter referred to as a "side sill kick-up portion 30") of the portion that is protruding downward is provided to protrude downward in a vertical wall shape with respect to the lower surface of the inclination portion 6s.

In this example, the side sill kick-up portion 30 is formed so that the length protruding downward increases as the side sill kick-up portion 30 approaches the rear side in correspondence to the shape of the inclination portion 6s that is inclined upward as the inclination portion 6s approaches the rear side with respect to the rear floor front portion 5F.

As illustrated in FIG. 1 and FIG. 2, the rear suspension 10 (only the right side of the vehicle is shown) of this embodiment is a torsion beam suspension. A trailing arm 11 included in the rear suspension 10 is supported at a place below the inclination portion 6s of the rear side frame 6 by an arm front end supporting portion 20 via a shaft member 13 (see FIG. 8) so that the rear side swings in the vertical direction about a front end portion 12 thereof (hereinafter referred to as an "arm front-end portion 12").

Now, reference numeral 14 in FIG. 1 and FIG. 2 indicates a torsion bar having a U-shaped cross section that connects left and right (only the right side of the vehicle is shown) trailing arms 11 to each other. Similarly, reference numeral 15 indicates a plate-like spring lower-end receiving member in which a flat spring lower-end receiving surface (not shown) is formed so as to face upward in a corner portion between the torsion bar 14 and a portion of the trailing arm 11 that is behind the torsion bar 14. Reference numeral 16 indicates a spring upper-end receiving member that is joined to the lower surface of the rear side frame 6 at a place above the spring lower-end receiving member 15 in a state in which a flat spring upper-end receiving surface 16a is facing downward. Note that the illustration of a damper and the like capable of expanding and contracting in the vertical direction that are placed between the upper end portion of the rear wheel house 7 and the rear end of the trailing arm 11 is omitted.

Figure 8:
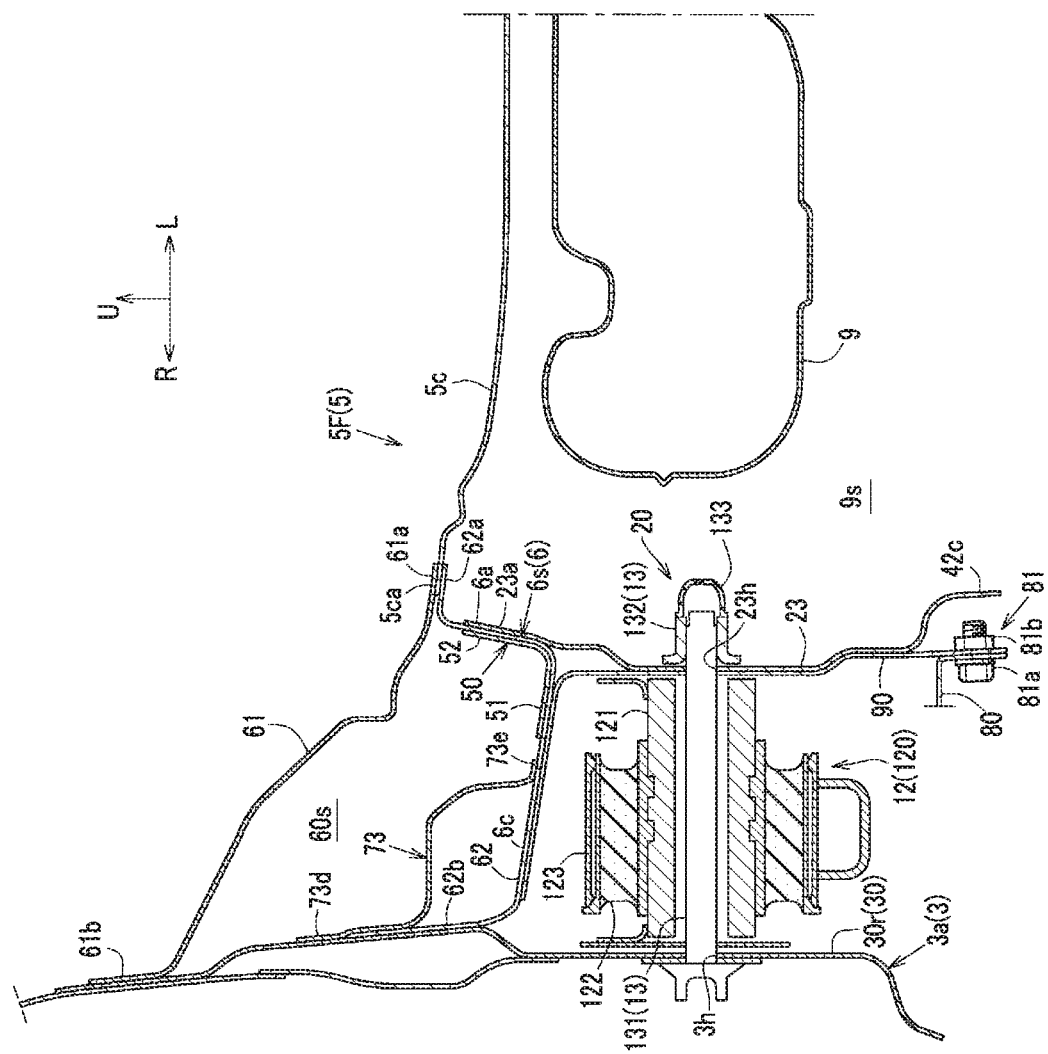
FIG. 8 is a cross-sectional view taken along line C-C in FIG. 2.

As illustrated in FIG. 8, in the arm front-end portion 12, a supported structure 120 pivotally supported by the arm front-end supporting portion 20 via a bolt 131 and a nut 132 serving as the shaft member 13 is formed. As illustrated in FIG. 8, the supported structure 120 includes an inner cylinder 121 in which the shaft member 13 is inserted, a rubber member 122 surrounding the inner cylinder 121, and an outer cylinder 123 provided on the outer periphery of the rubber member 122.

Figure 3:
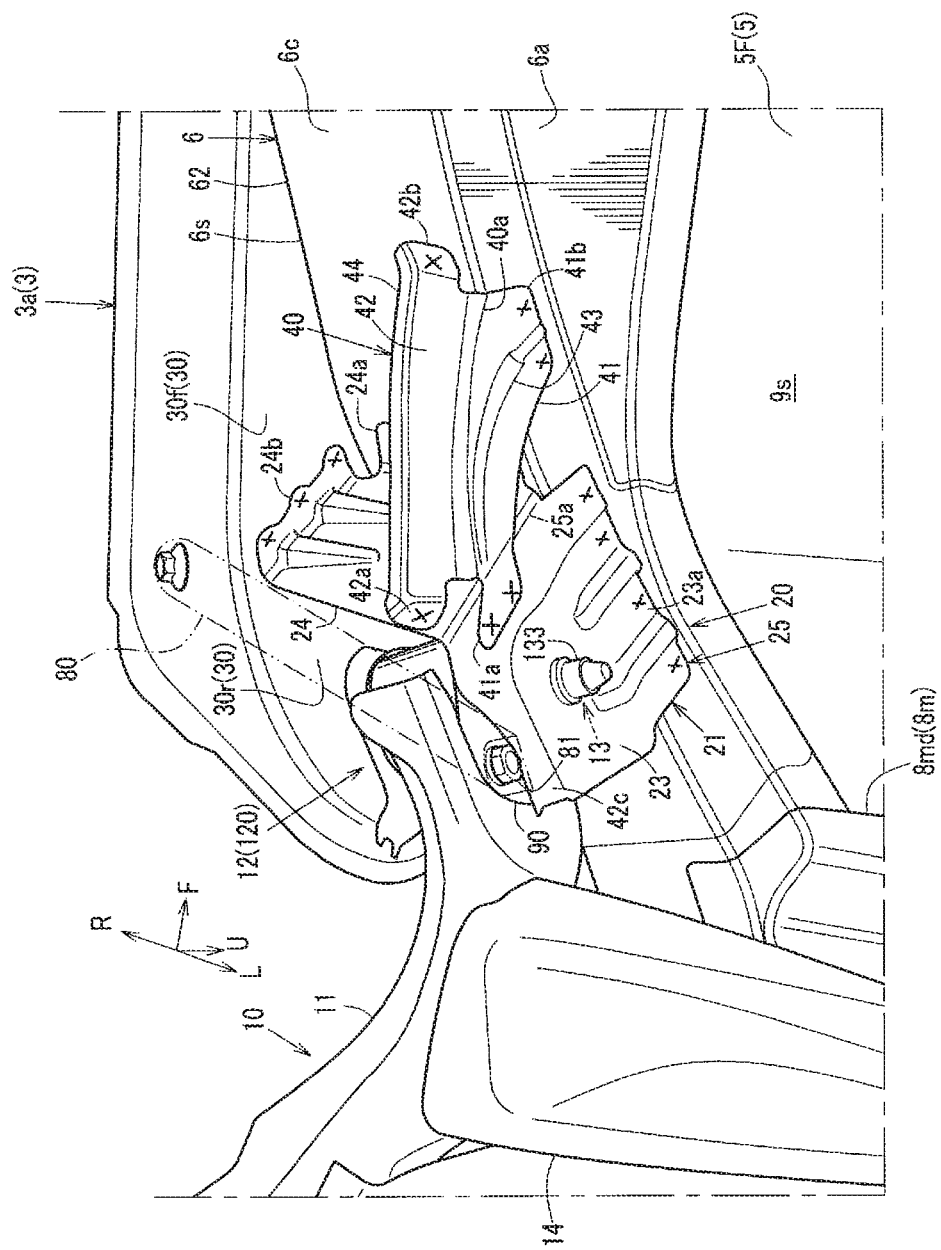
FIG. 3 is a main part enlarged view of FIG. 1.

As illustrated in FIG. 3, the arm front-end supporting portion 20 includes a squared U-shape portion 21 (also referred to as an "arm front-end supporting main body portion 21"). The squared U-shape portion 21 is arranged so as to surround each of the inner and outer sides and the front side of the arm front-end portion 12 in the vehicle width direction and so that the rear side and the lower side are open. The squared U-shape portion 21 has a U shape when viewed from the bottom of the vehicle.

The squared U-shape portion 21 includes a vehicle-width inner wall portion 23 and a vehicle-width outer wall portion 30r arranged on each of the inner and outer sides of the arm front-end portion 12 in the vehicle width direction in vertical wall shapes, and a front wall portion 24 that is on the front side of the arm front-end portion 12 and serves as a bridge between the vehicle-width outer wall portion 30r and the vehicle-width inner wall portion 23 in the vehicle width direction.

As illustrated in FIG. 8, through holes 23h and 3h that allow the shaft member 13 to pass therethrough are formed in the vehicle-width inner wall portion 23 and the vehicle-width outer wall portion 30r, respectively. The arm front-end portion 12 is pivotally supported by the rims of the through holes 23h and 3h via the shaft member 13 that serves as a bridge between the inner and outer wall portions 23 and 30r.

The distal end portion of the bolt 131 serving as the shaft member 13 is fastened by the nut 132. The fastening portion between the distal end portion of the bolt 131 and the nut 132 corresponds to a protruding portion that protrudes from the vehicle-width inner wall portion 23 toward the fuel tank 9, and is covered with a nut cap 133 formed by an elastic member such as rubber when viewed from the fuel tank 9 side (see FIG. 8).

As illustrated in FIG. 3, the vehicle-width inner wall portion 23 forms a surface that extends in the vehicle longitudinal direction at a place below the lower surface of the rear side frame 6. A joining flange portion 23a is integrally formed on the upper end of the surface. The joining flange portion 23a linearly extends to a place above the lower surface of the rear side frame 6, and is joined to the vehicle-width inner wall portion 6a of the rear side frame 6.

Figure 4:
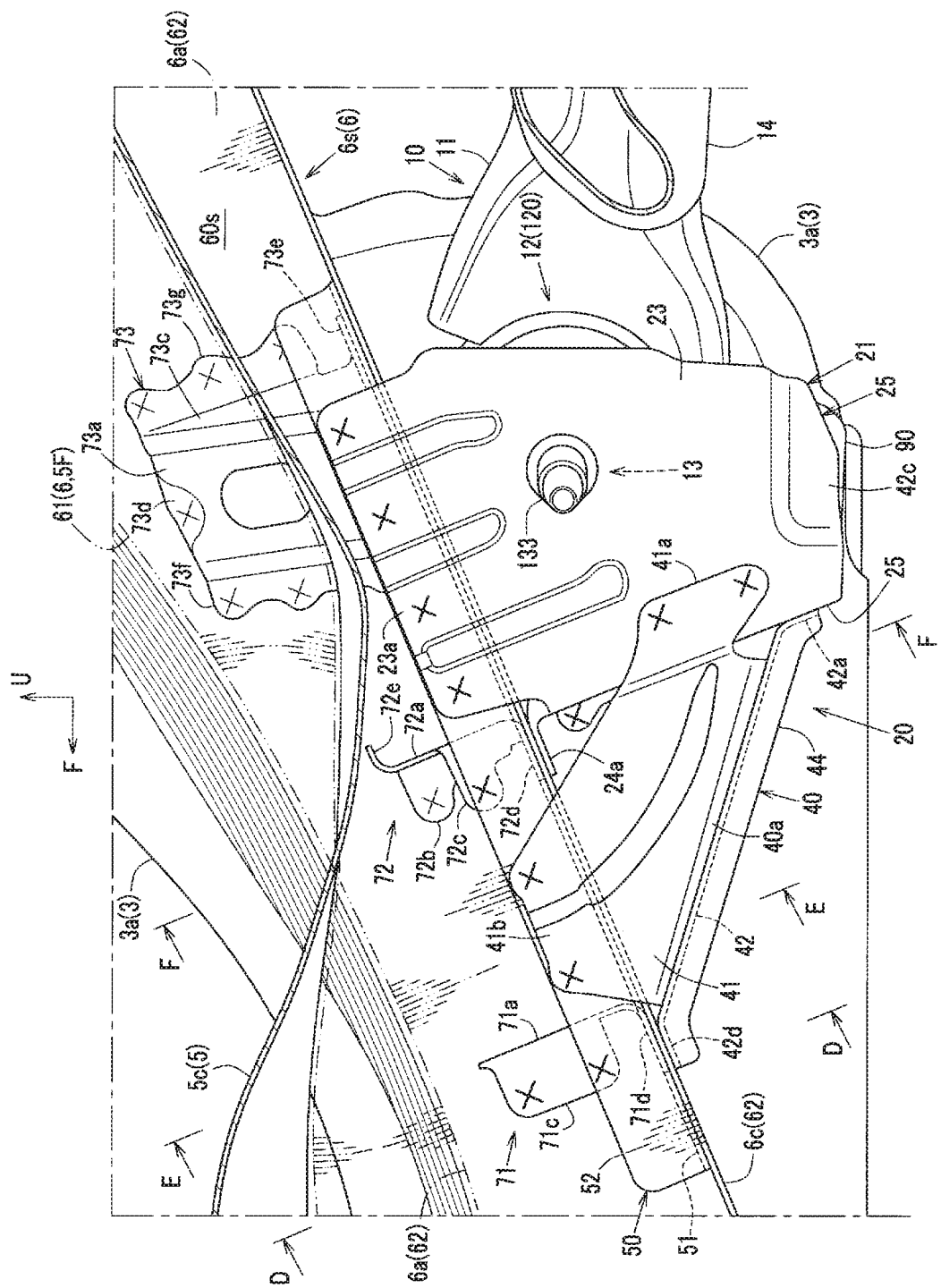
FIG. 4 is a cross-sectional view taken along line A-A in FIG. 2.
Figure 5:
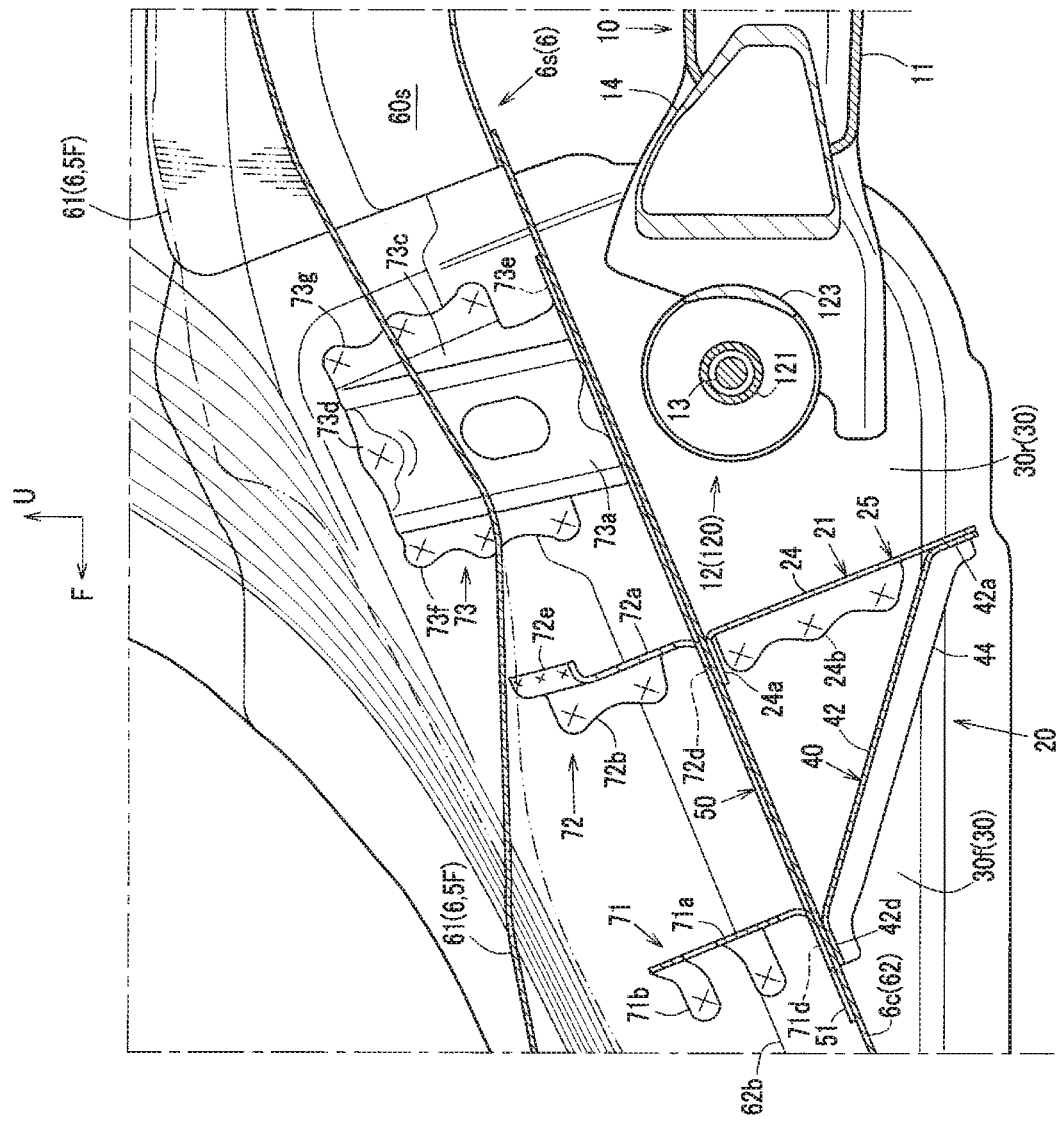
FIG. 5 is a cross-sectional view taken along line B-B in FIG. 2.

As illustrated in FIG. 3 to FIG. 5, the front wall portion 24 forms a surface extending in the vehicle width direction at a place below the lower surface of the rear side frame 6. A joining flange portion 24a is integrally formed in a bent manner on the upper end of the surface. The joining flange portion 24a extends to the front side of the vehicle so as to be able to be joined to the lower surface of the rear side frame 6.

Further, as illustrated in FIG. 3, a joining flange portion 24b is integrally formed on the outer end of the front wall portion 24 in the vehicle width direction in a bent manner. The joining flange portion 24b extends to the front side of the vehicle so as to be able to be joined to the side sill kick-up portion 30 of the side sill inner portion 3a.

The vehicle-width outer wall portion 30r is formed in a portion of the side sill kick-up portion 30 that behind the front wall portion 24 in the vehicle longitudinal direction, that is, an opposed portion opposed to the vehicle-width inner wall portion 23 across the arm front-end portion 12 so as to be on the outer side in the vehicle width direction.

In addition, the vehicle-width inner wall portion 23 and the front wall portion 24 are integrally formed by an arm front-end supporting bracket 25 formed by one member.

The arm front-end supporting bracket 25 is formed by one plate made of a steel material so that the front end of the vehicle-width inner wall portion 23 and the inner end of the front wall portion 24 in the vehicle width direction are integrally connected to each other, and a cross section (orthogonal cross section) in a direction orthogonal to the extending direction of a ridgeline 25a (bend portion) extending mainly in the vertical direction between the front end of the vehicle-width inner wall portion 23 and the inner end of the front wall portion 24 in the vehicle width direction is continuous via the ridgeline 25a. That is, the vehicle-width inner wall portion 23 and the front wall portion 24 are arranged at a substantially right angle, and the arm front-end supporting bracket 25 is formed to have a substantially L shape when viewed from the bottom of the vehicle.

Further, as illustrated in FIG. 3 and FIG. 8, the arm front-end supporting portion 20 of this embodiment includes a brace member 80, a reinforcement member 90, an extending vehicle-width outer wall portion 30f, and a gusset member 40 in addition to the squared U-shape portion 21.

As illustrated in FIG. 3 and FIG. 8, the brace member 80 serves as a bridge between the reinforcement member 90 arranged to be adjacent to the vehicle-width inner wall portion 23 of the squared U-shape portion 21 and the lower surface of the side sill inner portion 3a at a place below the arm front-end portion 12, and prevents the squared U-shape portion 21 formed to open downward from opening.

As illustrated in FIG. 2, FIG. 3, and FIG. 8, the reinforcement member 90 is a member that both supports the brace member 80 and particularly reinforces the vehicle-width inner wall portion 23 of the squared U-shape portion 21, and is arranged to be adjacent to the vehicle-width inner wall portion 23 on the outer side (the arm front-end portion 12 side) of the vehicle-width inner wall portion 23 in the vehicle width direction so as to substantially overlap with the vehicle-width inner wall portion 23 when viewed from the side of the vehicle.

As illustrated in FIG. 2, FIG. 3, and FIG. 8, the reinforcement member 90 is a member that both supports the brace member 80 and particularly reinforces the vehicle-width inner wall portion 23 of the squared U-shape portion 21, and is arranged to be adjacent to the vehicle-width inner wall portion 23 on the outer side (the arm front-end portion 12 side) of the vehicle-width inner wall portion 23 in the vehicle width direction and to substantially overlap with the vehicle-width inner wall portion 23 when viewed from the side of the vehicle.

As illustrated in FIG. 8, the inner end of the brace member 80 in the vehicle width direction is fixed to a portion in the reinforcement member 90 that is lower than a section corresponding to the arm front-end portion 12 when viewed from the side of the vehicle by fastening by a brace mounting portion 81 including a bolt 81a and a nut 81b.

In detail, as illustrated in FIG. 3 and FIG. 4, the inner end of the brace member 80 in the vehicle width direction is mounted to a position in the reinforcement member 90 corresponding to a corner portion between a lower edge and a rear edge of the vehicle-width inner wall portion 23 when viewed from the side of the vehicle via the bolt 81a and the nut 81b.

As illustrated in FIG. 8, in the brace mounting portion 81 corresponding to the mounting position of the inner end of the brace member 80 in the vehicle width direction in the reinforcement member 90, the distal end portion of the bolt 81a is fastened to the nut 81b. The fastening portion is arranged so as to protrude from the reinforcement member 90 to the fuel tank 9 included on the inner side in the vehicle width direction.

Further, as illustrated in FIG. 3, FIG. 4, and FIG. 8, in order to secure the arrangement space of the fastening portion between the bolt 81a and the nut 81b in the brace mounting portion 81, the corner portion of the vehicle-width inner wall portion 23 is formed to bulge out to the inner side in the vehicle width direction in correspondence with the protruding length of the fastening portion from the reinforcement member 90 to the inner side in the vehicle width direction, and is provided as a covering portion 42c that covers the fastening portion included in the brace mounting portion 81 from the fuel tank 9 side when viewed from the side of the vehicle.

In addition, as illustrated in FIG. 3, the gusset member 40 and the extending vehicle-width outer wall portion 30f both extend to the front side with respect to the front wall portion 24 of the squared U-shape portion 21, and extend between the front wall portion 24 and the lower surface of the rear side frame 6 so as to serve as a bridge between the front wall portion 24 and the lower surface of the rear side frame 6 on each of the inner and outer sides in the vehicle width direction at a place below the rear side frame 6.

In detail, as illustrated in FIG. 3, the extending vehicle-width outer wall portion 30f is formed in a vertical wall shape in a portion in the side sill kick-up portion 30 of the side sill inner portion 3a that is in front of the front wall portion 24, that is, a portion opposed to an inner-wall extending portion 41 of the gusset member 40 described below (see FIG. 7B). As illustrated in FIG. 3 and FIG. 6, the joining flange portion 24b of the front wall portion 24 is joined to the rear end of the extending vehicle-width outer wall portion 30f, and a joining flange portion 62b on the outer side of the rear side frame 6 in the vehicle width direction is joined to the upper side of the extending vehicle-width outer wall portion 30f (see FIG. 5 to FIG. 7A and FIG. 7B). The extending vehicle-width outer wall portion 30f extends in the vertical direction and the longitudinal direction between the joining flange portions 24b and 62b so as to serve as a bridge between the joining flange portions 24b and 62b.

As illustrated in FIG. 3, the gusset member 40 extends to the upper front direction from a lower front portion of the vehicle-width inner wall portion 23 of the squared U-shape portion 21 and is joined to a lower portion on the inner side of the rear side frame 6 in the vehicle width direction. The gusset member 40 includes the inner-wall extending portion 41 extending in the upper front direction from the vehicle-width inner wall portion 23 of the squared U-shape portion 21, and a front-wall extending portion 42 extending in the upper front direction from the front wall portion 24.

The gusset member 40 is formed by one plate made of a steel material so that the lower front end of the inner-wall extending portion 41 and the rear end of the front-wall extending portion 42 in the vehicle width direction are integrally connected via a ridgeline portion 40a (bend portion), and an orthogonal cross section orthogonal to the extending direction of the ridgeline portion 40a is continuous. The inner-wall extending portion 41 and the front-wall extending portion 42 are arranged at a substantially right angle. Note that the ridgeline portion 40a continuously extends from the lower rear end to the upper front end of the gusset member 40 between the inner-wall extending portion 41 and the front-wall extending portion 42.

A lower-rear-end joining flange portion 41a extending to a place behind the front wall portion 24 so as to be able to be joined to the vehicle-width inner wall portion 23 is integrally formed on the lower rear end of the inner-wall extending portion 41. Further, an upper-front-end joining flange portion 41b extending to a place above the lower surface of the rear side frame 6 so as to be able to be joined to the vehicle-width inner wall portion 6a of the rear side frame 6 is integrally formed on the upper front end of the inner-wall extending portion 41.

A lower-rear-end joining flange portion 42a extending downward so as to be able to be joined to the front wall portion 24 is integrally formed on the lower rear end of the front-wall extending portion 42 in a bent manner. Further, an upper-front-end joining flange portion 42b extending frontward so as to be able to be joined to the lower surface (lower wall portion 6c) of the rear side frame 6 is integrally formed in the upper front end of the front-wall extending portion 42 in a bent manner.

In the gusset member 40, the lower-rear-end joining flange portions 41a and 42a of the inner-wall extending portion 41 and the front-wall extending portion 42 are joined to the lower front portion of the vehicle-width inner wall portion 23 and the lower portion on the inner side of the front wall portion 24 in the vehicle width direction of the squared U-shape portion 21, respectively, and the upper-front-end joining flange portions 41b and 42b of the inner-wall extending portion 41 and the front-wall extending portion 42 are joined to a position on the front side of the inclination portion 6s that is spaced from the front wall portion 24 of the squared U-shape portion 21.

As a result, the gusset member 40 extends so as to surround the corner portion between the front wall portion 24 and the lower surface of the rear side frame 6 located in front of the front wall portion 24 from below and from the front thereof when viewed from the side of the vehicle.

The inner-wall extending portion 41 is formed to be substantially in the same plane as the vehicle-width inner wall portion 23 via the vehicle-width inner wall portion 6a of the rear side frame 6. A reinforcing bead 43 extending so as to connect the lower-rear-end joining flange portion 41a and the upper-front-end joining flange portion 41b to each other is provided on the inner-wall extending portion 41.

The reinforcing bead 43 is formed by causing a part of the inner-wall extending portion 41 to have a shape protruding to the inner side in the vehicle width direction with respect to the periphery. Further, the reinforcing bead 43 extends in an arch shape from the front end (base end) side of the lower-rear-end joining flange portion 41a so as to extend upward as the reinforcing bead 43 approaches the front side and so that the middle portion makes a detour to the front side and the lower side when viewed from the side of the vehicle. Further, the reinforcing bead 43 continuously extends until the upper front end of the reinforcing bead 43 reaches the lower end (distal end) side of the upper-front-end joining flange portion 41b at a position in the middle of the upper-front-end joining flange portion 41b in the vehicle longitudinal direction.

The gusset member 40 includes a reinforcement flange portion 44 that is formed by causing the outer end of the front-wall extending portion 42 to protrude downward by bending the outer end of the front-wall extending portion 42 downward.

The reinforcement flange portion 44 includes the lower-rear-end joining flange portion 42a and the upper-front-end joining flange portion 42b of the front-wall extending portion 42, and is continuously formed between the lower-rear-end joining flange portion 42a and the upper-front-end joining flange portion 42b.

In addition, as illustrated in FIG. 4 to FIG. 8, on the periphery of the rear side frame 6 of this embodiment in the vehicle longitudinal direction, that is, at least in the closed cross section 60s included in the inclination portion 6s, joint members 71, 72, and 73 (bulkheads) and a rear side frame reinforcement 50 serving as a reinforcement member of the rear side frame 6 are arranged.

As illustrated in FIG. 6 to FIG. 8, the rear side frame reinforcement 50 is arranged in a corner portion on the inner side and the lower side of the closed cross section 60s of the rear side frame 6 in the vehicle width direction. As illustrated in FIG. 4 to FIG. 6, the rear side frame reinforcement 50 extends from the front portion to the rear portion of the inclination portion 6s along the vehicle longitudinal direction.

As illustrated in FIG. 6, the rear side frame reinforcement 50 is integrally formed by a reinforcement lower-wall inner-side portion 51 extending in the vehicle width direction so as to be able to be joined to the lower wall portion 6c of the rear side frame 6 from the upper surface thereof, and a reinforcement inner-wall lower-side portion 52 extending upward from the inner end of the reinforcement lower-wall inner-side portion 51 in the vehicle width direction so as to be able to be joined to the vehicle-width inner wall portion 6a of the rear side frame 6 from the outer surface thereof in the vehicle width direction.

As illustrated in FIG. 4 and FIG. 6, a plurality of the joint members 71, 72, and 73 (bulkheads) are arranged in the inclination portion 6s of the rear side frame 6 so as to be spaced apart from each other in the vehicle longitudinal direction. In this example, the joint members 71, 72, and 73 include a front-side joint member 71 arranged on the front portion of the inclination portion 6s, a middle joint member 72 arranged on the rear side of the front-side joint member 71, and a rear-side joint member 73 arranged on the rear side of the middle joint member 72.

As illustrated in FIG. 4 and FIG. 5, the front-side joint member 71 is arranged in a position close to the front portion of the gusset member 40, that is, in this example, a position that matches with the upper-front-end joining flange portion 42b of the gusset member 40 in the vehicle longitudinal direction in the closed cross section 60s extending along the vehicle longitudinal direction of the inclination portion 6s. Further, in this example, as illustrated in the same figures, the middle joint member 72 is arranged in a position that matches with the front wall portion 24 in the closed cross section 60s extending along the vehicle longitudinal direction of the inclination portion 6s, and the rear-side joint member 73 is arranged in a position that matches with the arm front-end portion 12 in the closed cross section 60s extending along the vehicle longitudinal direction of the inclination portion 6s.

As illustrated in FIG. 4 to FIG. 6, the front-side joint member 71 is integrally formed by a panel-like joint main body wall portion 71a that forms an orthogonal surface with respect to the vehicle longitudinal direction so as to partition the closed cross section 60s extending in the vehicle longitudinal direction of the inclination portion 6s (see FIG. 5 and FIG. 6), a vehicle-width outer-edge joining flange portion 71b formed in a bent manner so as to extend frontward from the outer end of the joint main body wall portion 71a in the vehicle width direction (see the same figures), a vehicle-width inner-edge joining flange portion 71c formed in a bent manner so as to extend frontward from the inner end of the joint main body wall portion 71a in the vehicle width direction (see FIG. 4 and FIG. 6), and a lower-edge joining flange portion 71d formed in a bent manner so as to extend frontward from the lower end of the joint main body wall portion 71a (see FIG. 6).

As illustrated in the same figures, the middle joint member 72 is integrally formed by a panel-like joint main body wall portion 72a that forms an orthogonal surface with respect to the vehicle longitudinal direction as with the front-side joint member 71 (see FIG. 5 and FIG. 6), a vehicle-width outer-edge joining flange portion 72b formed in a bent manner so as to extend frontward from the outer end of the joint main body wall portion 72a in the vehicle width direction, a vehicle-width inner-edge joining flange portion 72c formed in a bent manner so as to extend frontward from the inner end of the joint main body wall portion 72a in the vehicle width direction (see FIG. 4 and FIG. 6), a lower-edge joining flange portion 72d formed in a bent manner so as to extend frontward from the lower end of the joint main body wall portion 72a (see FIG. 6), and an upper-edge joining flange portion 72e formed in a bent manner so as to extend rearward from the upper end of the joint main body wall portion 72a.

As illustrated in the same figures, the rear-side joint member 73 includes a joint main body wall portion 73a that serves as a bridge between the side sill inner portion 3a and the lower wall portion 6c of the rear side frame 6, and a front wall portion 73b (see FIG. 6) and a rear wall portion 73c (see FIG. 4 and FIG. 5) extending downward from the front and rear edge portions of the joint main body wall portion 73a. Joining flange portions 73d and 73e that are joined to the side sill inner portion 3a and the lower wall portion 6c of the rear side frame 6 are formed on the upper and lower edge portions of the joint main body wall portion 73a. Further, joining flange portions 73f and 73g that extend to the front and rear sides and are joined to the side sill inner portion 3a are formed on the outer ends of the front wall portion 73b and the rear wall portion 73c in the vehicle width direction.

As illustrated in FIG. 6, the front-side joint member 71 has a vehicle-width outer-edge joining flange portion 71b that is joined to the side sill inner portion 3a from the inner side in the vehicle width direction, a vehicle-width inner-edge joining flange portion 71c that is joined to the vehicle-width inner wall portion 6a of the rear side frame 6 from the outer side in the vehicle width direction, and a lower-edge joining flange portion 71d that is joined to the lower wall portion 6c of the rear side frame 6 from the upper side.

Now, as illustrated in FIG. 6, the vehicle-width inner-edge joining flange portion 71c is joined to the vehicle-width inner wall portion 6a of the rear side frame 6 from the outer side in the vehicle width direction, but the lower portion of the vehicle-width inner-edge joining flange portion 71c is joined to the vehicle-width inner wall portion 6a of the rear side frame 6 via the upper portion of the reinforcement inner-wall lower-side portion 52 of the rear side frame reinforcement 50. That is, three-piece joining of the lower portion of the vehicle-width inner-edge joining flange portion 71c, the upper portion of the reinforcement inner-wall lower-side portion 52 of the rear side frame reinforcement 50, and the vehicle-width inner wall portion 6a of the rear side frame 6 is performed by spot welding and the like.

Meanwhile, as illustrated in the same figure, the upper portion of the vehicle-width inner-edge joining flange portion 71c is directly joined to the vehicle-width inner wall portion 6a of the rear side frame 6, but the joining section corresponds to the joining portion between the upper-side configuration member 62u forming the upper portion of the rear side frame lower portion 62 (the upper portion of the vehicle-width inner wall portion 6a) and the lower-side configuration member 62d forming the lower portion of the rear side frame 6. That is, three-piece joining of the vehicle-width inner-edge joining flange portion 71c of the front-side joint member 71 and the configuration members 62u and 62d on the upper and lower sides of the rear side frame lower portion 62 is performed by spot welding and the like.

In addition, as illustrated in FIG. 6, the upper-front-end joining flange portion 42b of the front-wall extending portion 42 of the gusset member 40 is joined to the lower wall portion 6c of the rear side frame 6 from below, and the reinforcement lower-wall inner-side portion 51 of the rear side frame reinforcement 50 is joined to the lower wall portion 6c of the rear side frame 6 from above. That is, three-piece joining of the front side flange portion, the lower wall portion 6c of the rear side frame 6, and the reinforcement lower-wall inner-side portion 51 is performed by spot welding and the like so that the upper-front-end joining flange portion 42b and the reinforcement lower-wall inner-side portion 51 work together to sandwich the lower wall portion 6c therebetween.

In addition, as illustrated in FIG. 7A, the upper-front-end joining flange portion 41b of the inner-wall extending portion 41 of the gusset member 40 is joined to the vehicle-width inner wall portion 6a of the rear side frame 6 from the inner side in the vehicle width direction, and the reinforcement inner-wall lower-side portion 52 of the rear side frame reinforcement 50 is joined to the vehicle-width inner wall portion 23 from the outer side in the vehicle width direction. That is, three-piece joining of the upper-front-end joining flange portion 41b, the vehicle-width inner wall portion 6a, and the reinforcement inner-wall lower-side portion 52 is performed by spot welding and the like so that the upperfront-end joining flange portion 41b and the reinforcement inner-wall lower-side portion 52 work together to sandwich the vehicle-width inner wall portion 6a therebetween.

In addition, as illustrated in FIG. 7B, the vehicle-width outer-edge joining flange portions 72b on the upper and lower sides of the middle joint member 72 are joined to the side sill inner portion 3a from the inner side in the vehicle width direction. Out of the vehicle-width outer-edge joining flange portions 72b, the vehicle-width outer-edge joining flange portion 72b on the lower side is joined to the side sill inner portion 3a via the joining flange portion 62b on the outer side of the rear side frame lower portion 62 in the vehicle width direction.

That is, three-piece joining of the vehicle-width outer-edge joining flange portion 72b on the lower side of the middle joint member 72, the vehicle-width inner wall portion of the side sill inner portion 3a, and the joining flange portion 62b is performed by spot welding and the like.

Further, as illustrated in FIG. 7B, the lower-edge joining flange portion 72d of the middle joint member 72 is joined to the lower wall portion 6c of the rear side frame 6 from above. Meanwhile, in the joining section, the joining flange portion 24a of the front wall portion 24 included in the squared U-shape portion 21 is joined to the lower wall portion 6c of the rear side frame 6 from below. That is, three-piece joining of the lower-edge joining flange portion 72d, the lower wall portion 6c, and the joining flange portion 24a is performed by spot welding and the like.

Further, as illustrated in the same figure, the vehicle-width inner-edge joining flange portion 72c of the middle joint member 72 is joined to the vehicle-width inner wall portion 6a of the rear side frame 6 from the outer side in the vehicle width direction. Meanwhile, in the joining section, the reinforcement inner-wall lower-side portion 52 of the rear side frame reinforcement 50 is joined to the vehicle-width inner wall portion 6a of the rear side frame 6 from the outer side in the vehicle width direction, and three-piece joining of the vehicle-width inner-edge joining flange portion 72c, the reinforcement inner-wall lower-side portion 52, and the vehicle-width inner wall portion 6a is performed by spot welding and the like.

In addition, as illustrated in FIG. 6, the upper-edge joining flange portion 72e of the middle joint member 72 is joined to the rear floor side panel 61 from below.

As illustrated in FIG. 1 and FIG. 2, in the lower vehicle-body structure of the vehicle of this embodiment described above, the arm front-end supporting portions 20 that support the arm front-end portions 12 serving as the front ends of the trailing arms 11 of the rear suspension 10 are formed on the lower portions of the left and right rear side frames 6 (rear frames) forming the closed cross section 60s (see FIG. 4 to FIG. 8) extending in the vehicle longitudinal direction, the squared U-shape portion 21 including the vehicle-width outer wall portion 30r (outer wall portion) on the outer side in the vehicle width direction, the vehicle-width inner wall portion 23 (inner wall portion) on the inner side in the vehicle width direction, and the front wall portion 24 with a rear side being open when viewed from the bottom is included in each of the arm front-end supporting portions 20, the extending vehicle-width outer wall portion 30f (extending outer wall portion) is formed in a place in front of the front wall portion 24 in the arm front-end supporting portion 20 (see FIG. 1 to FIG. 3), the vehicle-width outer wall portion 30r and the extending vehicle-width outer wall portion 30f are formed by the side sill inner portion 3a joined to the rear side frame 6 from the outer side thereof in the vehicle width direction, and the gusset member 40 that extends from the vehicle-width inner wall portion 23 to a place in front of the front wall portion 24 and is joined to the rear side frame 6 is included (see FIG. 1 to FIG. 3 and particularly FIG. 3).

According to the configuration described above, the vibration input amount to the vehicle body in the vehicle width direction out of the vibration input to the arm front-end supporting portion 20 from the arm front-end portion 12 serving as the vibration input point can be particularly reduced in an effective manner by the squared U-shape portion 21 included in the arm front-end supporting portion 20.

Further, in this embodiment, the arm front-end supporting portion 20 includes the extending vehicle-width outer wall portion 30f formed by the side sill inner portion 3a, and the gusset member 40, and the extending vehicle-width outer wall portion 30f and the gusset member 40 are both joined to the rear side frame 6 serving as the vehicle body stiffness member in which the closed cross section 60s is formed in the vehicle longitudinal direction. Therefore, by the extending vehicle-width outer wall portion 30f and the gusset member 40, the vibration input amount to the vehicle body in the vehicle vertical direction and the vehicle longitudinal direction out of the vibration input from the vibration input point can be particularly reduced in an effective manner in addition to the improvement in the support stiffness of the arm front-end portion 12, and the floor vibration can be effectively reduced, for example.

In addition, in this embodiment, by forming the vehicle-width outer wall portion 30r and the extending vehicle-width outer wall portion 30f forming a part of the arm front-end supporting portion 20 with use of the side sill inner portion 3a, the support stiffness of the front end of the trailing arm 11 can be increased without separately including a member with high stiffness.

As an aspect of the present disclosure, the gusset member 40 includes the inner-wall extending portion 41 extending frontward from the vehicle-width inner wall portion 23, and the front-wall extending portion 42 that extends frontward from the front wall portion 24 and is continuous with the inner-wall extending portion 41 via the ridgeline portion 40a (see FIG. 3, FIG. 6, and FIG. 7A and FIG. 7B).

According to the configuration described above, the stiffness of the entire gusset member 40 can be improved by forming the gusset member 40 in a shape including the ridgeline portion 40a.

Specifically, the load in the vehicle longitudinal direction acts on the arm front-end supporting portion 20 due to the tractive force on the rear side of the vehicle acting on rear wheels (not shown) while traveling, for example. However, by forming the gusset member 40 to have a shape including the ridgeline portion 40a extending with a component in the vehicle longitudinal direction, the arm front-end supporting portion 20 can be particularly reinforced for the load in the vehicle longitudinal direction as above.

As an aspect of the present disclosure, the gusset member 40 includes the reinforcement flange portion 44 bendable downward from the outer end of the front-wall extending portion 42 in the vehicle width direction (see FIG. 3 to FIG. 7A and FIG. 7B).

According to the configuration described above, the stiffness of the front-wall extending portion 42 can be improved by forming the reinforcement flange portion 44 described above on the front-wall extending portion 42 of the gusset member 40.

As an aspect of the present disclosure, the gusset member 40 includes the reinforcing bead 43 extending from the vehicle-width inner wall portion 23 to the upper-front-end joining flange portion 41b serving as the joining portion to the rear side frame 6 in the inner-wall extending portion 41 (see FIG. 3 and FIG. 4).

According to the configuration described above, the stiffness of the inner-wall extending portion 41 can be improved by including the reinforcing bead 43 in the inner-wall extending portion 41 of the gusset member 40.

As an aspect of the present disclosure, the rear side frame reinforcement 50 (rear frame reinforcement) is included in the closed cross section 60s in the rear side frame 6 (see FIG. 4 to FIG. 8), the rear side frame reinforcement 50 is formed by the reinforcement lower-wall inner-side portion 51 arranged on the inner side of the lower wall portion 6c of the rear side frame 6 in the vehicle width direction (see FIG. 5 and FIG. 6), and the reinforcement inner-wall lower-side portion 52 arranged on the lower portion of the vehicle-width inner wall portion 6a (inner wall) (see FIG. 4 and FIG. 6). The upper-front-end joining flange portion 42b of the front-wall extending portion 42 and the reinforcement lower-wall inner-side portion 51 (see FIG. 6) are joined to each other and the upper-front-end joining flange portion 41b of the inner-wall extending portion 41 and the reinforcement inner-wall lower-side portion 52 (see FIG. 7A) are joined to each other so as to sandwich the lower wall portion 6c and the vehicle-width inner wall portion 6a of the rear side frame 6, respectively.

According to the configuration described above, the stiffness of the joining portion between the gusset member 40 and the rear side frame 6 can be improved by the rear side frame reinforcement 50.

As an aspect of the present disclosure, the front-side joint member 71 (joint member) is included in the closed cross section 60s in the rear side frame 6 at a position close to the front portion of the gusset member 40 (see FIG. 4 to FIG. 6).

According to the configuration described above, the place between the gusset member 40 and the side sill 3 can be reinforced by the front-side joint member 71. In particular, the bracing force of the gusset member 40 with respect to the vibration in the vehicle vertical direction out of the vibration input to the arm front-end supporting portion 20 from the arm front-end portion 12 serving as the vibration input point can be particularly increased.

(Modified Example of Arm Front-End Supporting Portion)

Next, an arm front-end supporting portion 20A of Embodiment 2 according to a modified example of the arm front-end supporting portion 20 (hereinafter referred to as "the arm front-end supporting portion 20 of Embodiment 1") included in the lower vehicle-body structure of the vehicle described above is described with reference to FIG. 9 to FIG. 13. However, configurations that are similar to those of the arm front-end supporting portion 20 of Embodiment 1 are denoted by the same reference characters, and the description thereof is omitted.

As illustrated in FIG. 9 to FIG. 12, in the arm front-end supporting portion 20A, an extending vehicle-width inner wall portion 26 joined to the inclination portion 6s of the rear side frame 6 is formed in a place in front of a vehicle-width inner wall portion 23A in a squared U-shape portion 21A. The extending vehicle-width inner wall portion 26 is integrally molded together with the vehicle-width inner wall portion 23A by a first gusset member 27 formed by one member, and corresponds to a portion of the first gusset member 27 extending to a place in front of a front wall portion 24A.

That is, in the squared U-shape portion 21A of Embodiment 2, the vehicle-width inner wall portion 23A and the front wall portion 24A are not integrally formed via the ridgeline 25a (bend portion) as in the squared U-shape portion 21 of Embodiment 1 (see FIG. 3). As illustrated in FIG. 9 to FIG. 12, the vehicle-width inner wall portion 23A is formed by the first gusset member 27, and the front wall portion 24A is formed by a second gusset member 28 in a separated manner. Further, the arm front-end supporting portion 20A of Embodiment 2 does not include the gusset member 40 (see FIG. 3) as that included in the arm front-end supporting portion 20 of Embodiment 1.

The extending vehicle-width inner wall portion 26 extends frontward so as to be continuous from the front end of the vehicle-width inner wall portion 23A. Substantially the entire extending vehicle-width inner wall portion 26 is formed to protrude to a place below the lower surface of the inclination portion 6s of the rear side frame 6.

Figure 9:
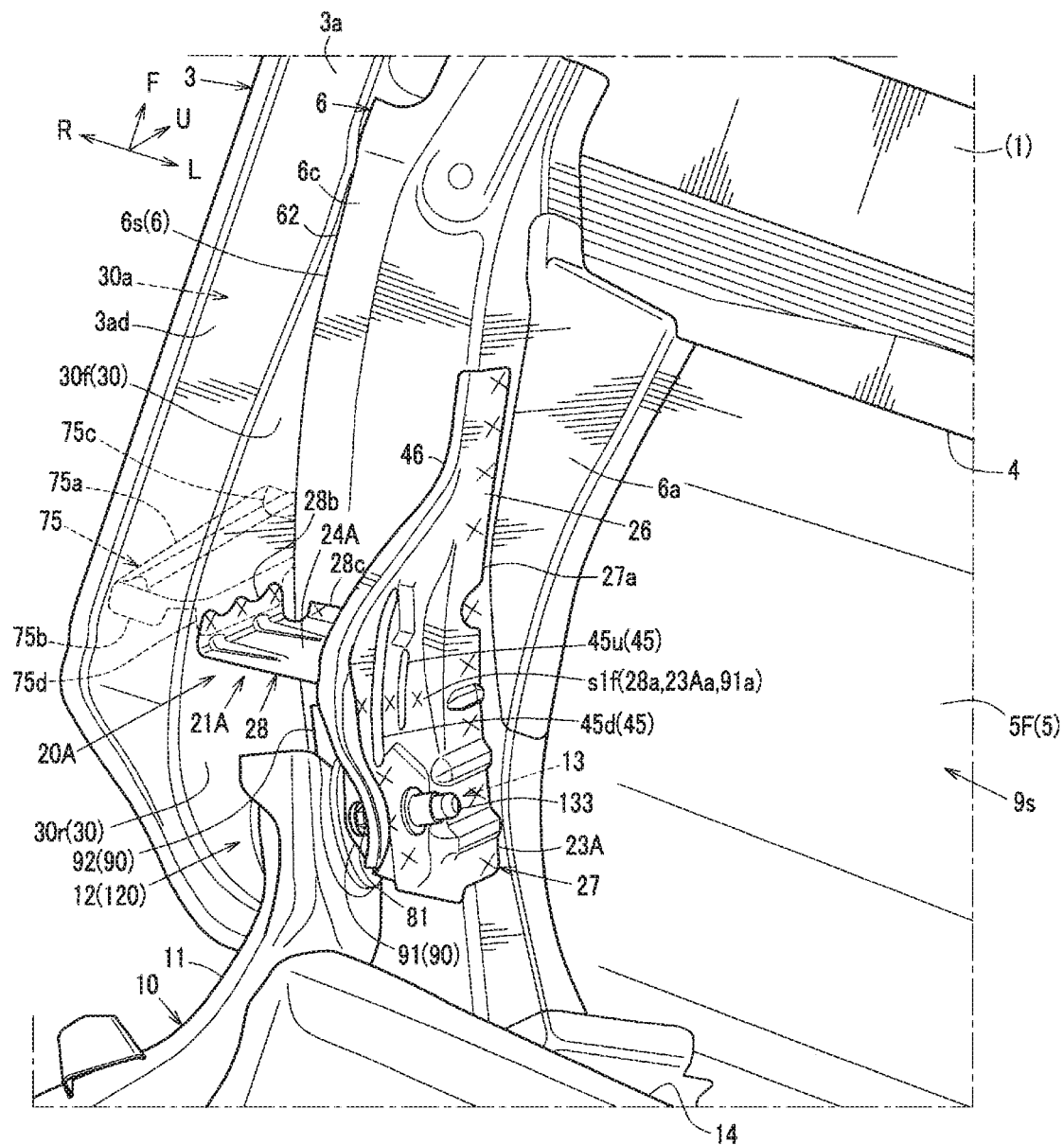
FIG. 9 is a perspective view illustrating the main part of a lower vehicle-body structure on the right side of a vehicle of another embodiment viewed from below and the center side in the vehicle width direction.
Figure 12:
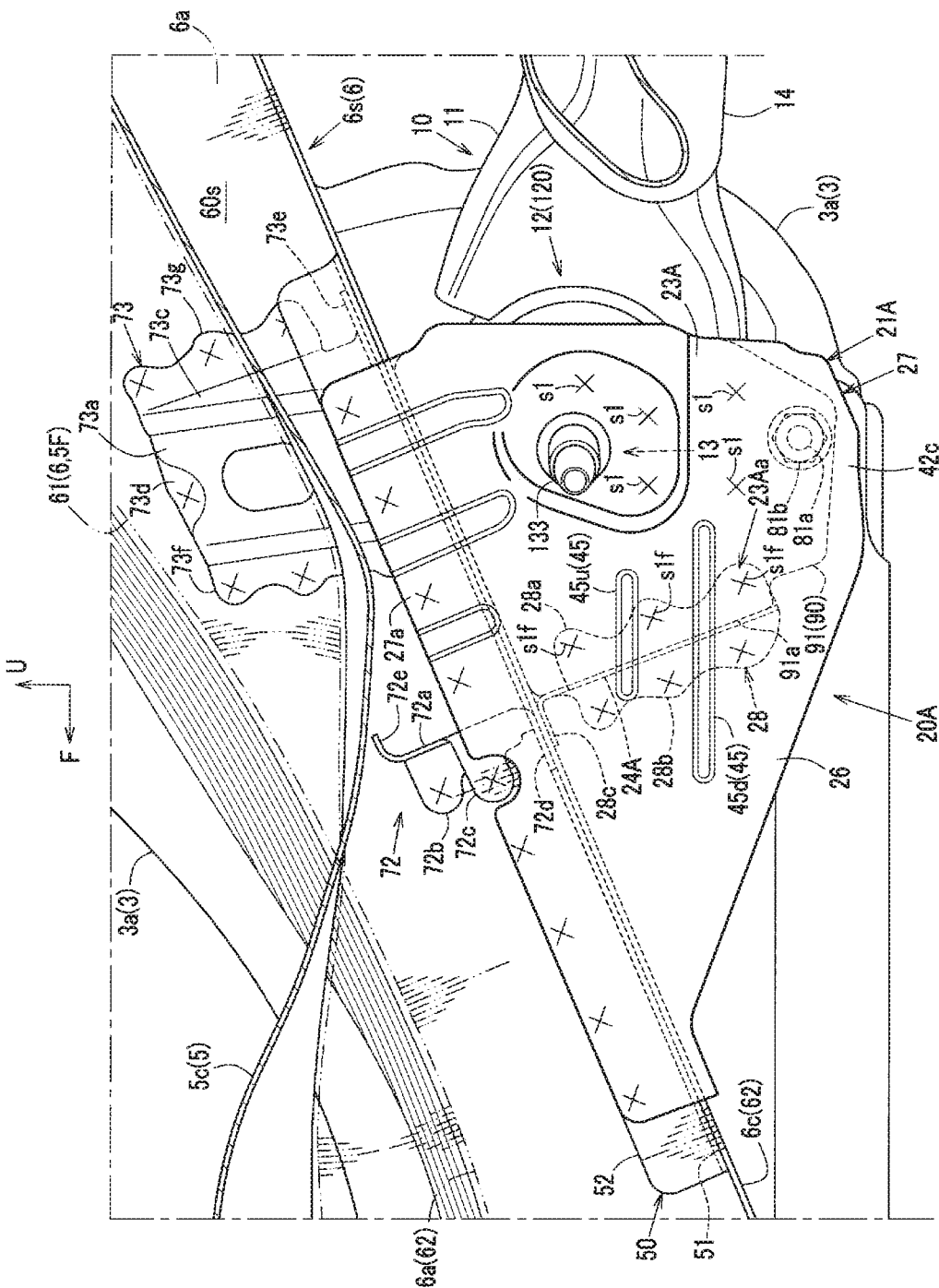
FIG. 12 is a cross-sectional view taken along line A-A in FIG. 2.

As illustrated in FIG. 9 and FIG. 12, the lower end of the extending vehicle-width inner wall portion 26 extends from the lower end of the vehicle-width inner wall portion 23A to the vehicle front direction so as to form a continuous smooth ridgeline. Specifically, the extending vehicle-width inner wall portion 26 is formed so that the lower end is inclined upward as the lower end approaches the front side in order to gradually reduce the length protruding downward as the extending vehicle-width inner wall portion 26 approaches the front side from the rear end to the front portion of the extending vehicle-width inner wall portion 26.

Substantially the entire first gusset member 27 is formed by the vehicle-width inner wall portion 23A and the extending vehicle-width inner wall portion 26, and the first gusset member 27 is formed by a steel plate that extends to the vehicle longitudinal direction and the vertical direction so as to stride over the front wall portion 24A along the inner end in the vehicle width direction at a place below the rear side frame 6.

As illustrated in the same figures, on the upper end of the first gusset member 27, an upper-end joining flange portion 27a that can be joined to the rear side frame 6 is formed across the entire vehicle longitudinal direction. The upper-end joining flange portion 27a of the first gusset member 27 is joined to a portion of the rear side frame 6 that is below the vehicle-width inner wall portion 23A from the inner side in the vehicle width direction by spot welding and the like in the vehicle longitudinal direction at a plurality sections (see FIG. 9, FIG. 12, and FIG. 13). In this example, joining is performed in four sections in each of sections corresponding to the vehicle-width inner wall portion 23A and the extending vehicle-width inner wall portion 26 in the vehicle longitudinal direction in the upper-end joining flange portion 27a, that is, in a total of eight sections.

Figure 10:
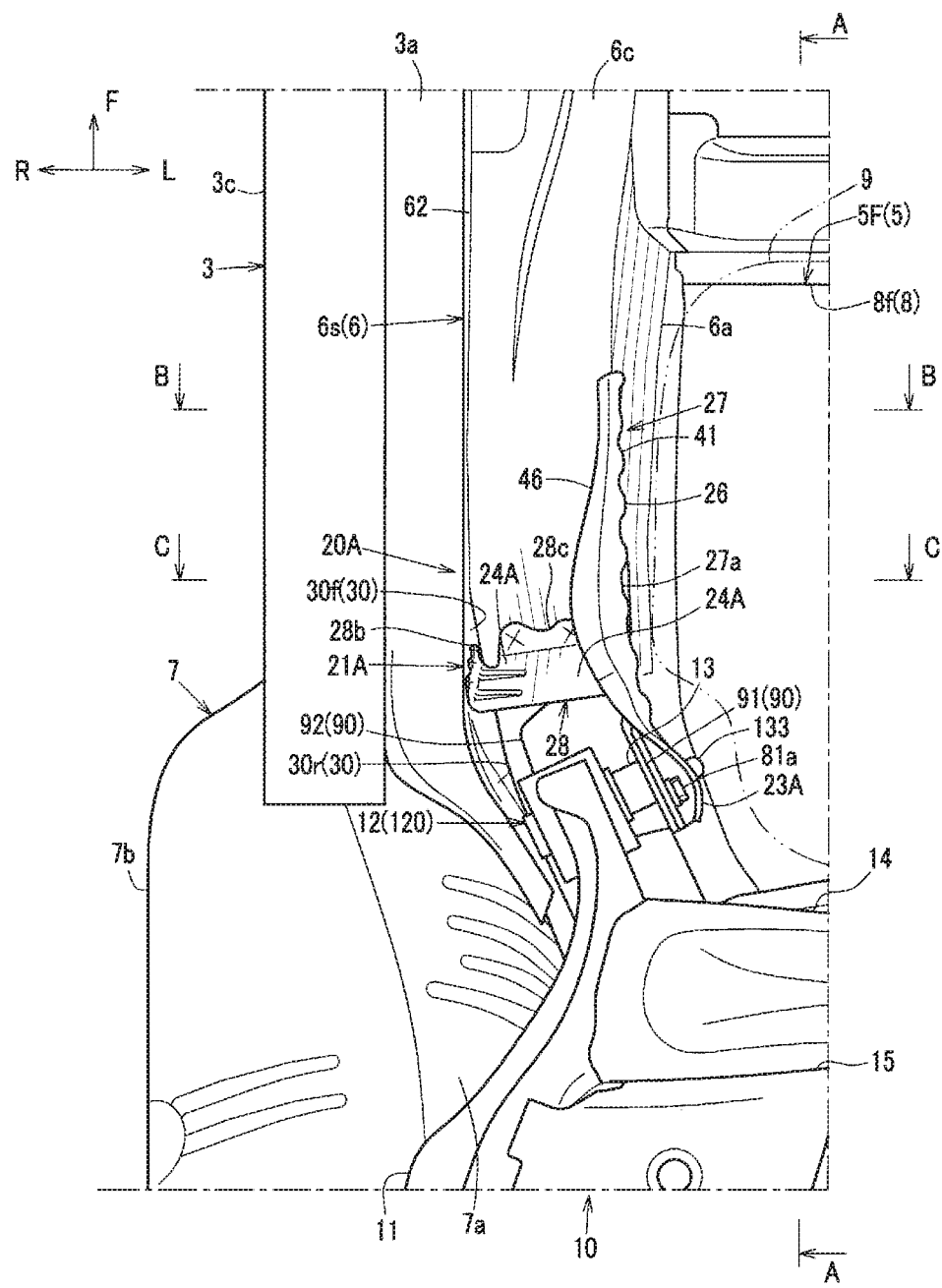
FIG. 10 is a bottom view illustrating the main part of the lower vehicle-body structure of the other embodiment.

Now, as illustrated in FIG. 9 and FIG. 10, the reinforcement member 90 described above is integrally formed by a vehicle-width inner wall portion 91 arranged to be adjacent to the vehicle-width inner wall portion 23A of the first gusset member 27 on the outer side of the vehicle-width inner wall portion 23A in the vehicle width direction so as to substantially overlap with the vehicle-width inner wall portion 23A when viewed from the side of the vehicle (see FIG. 9 to FIG. 12), and an upper wall portion 92 that extends from the upper end of the vehicle-width inner wall portion 91 to the outer side in the vehicle width direction and is joined to the lower surface of the rear side frame 6.

Figure 11:
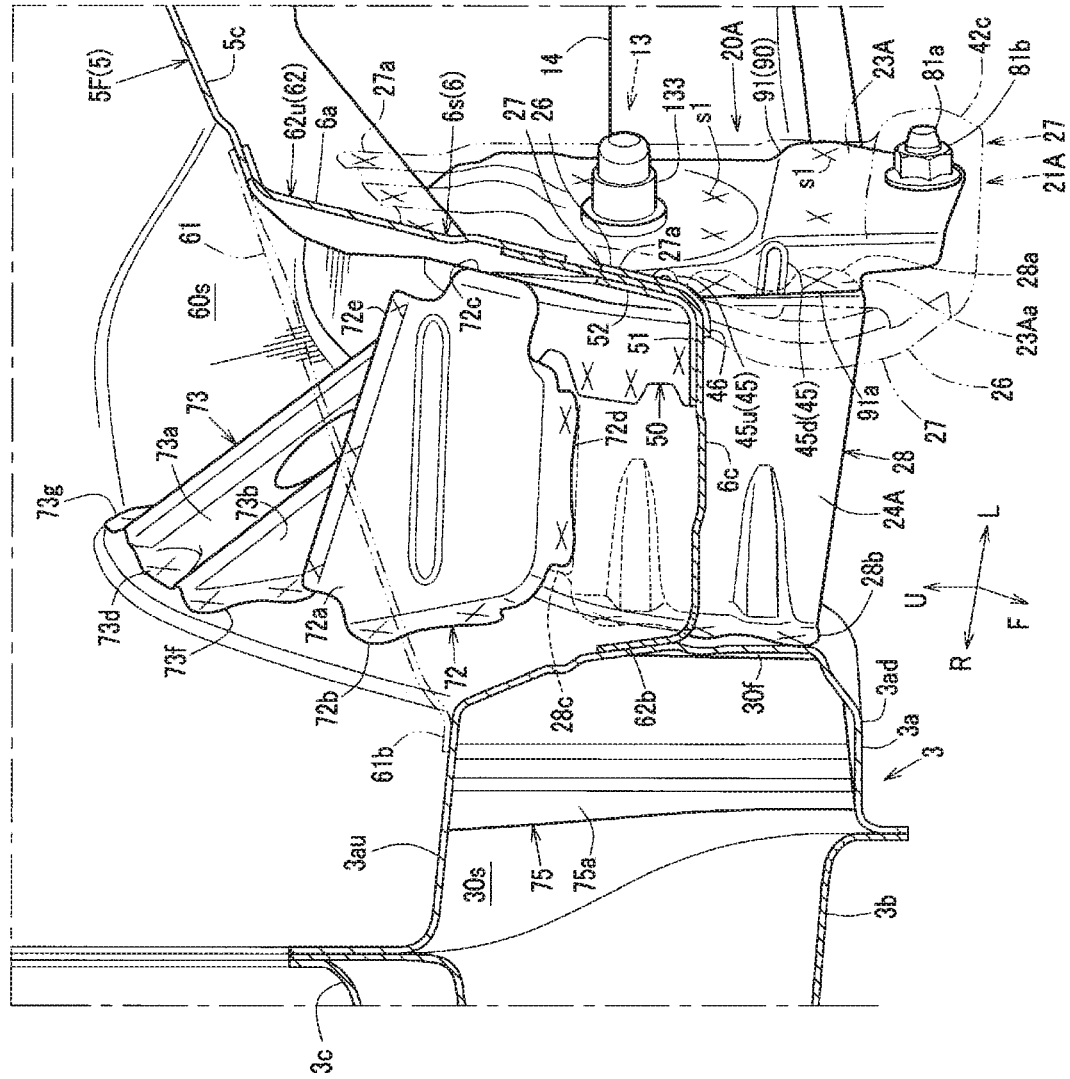
FIG. 11 is a cross-sectional view taken along line B-B in FIG. 2.

Further, as particularly illustrated in FIG. 12 out of FIG. 9, FIG. 11, and FIG. 12, the vehicle-width inner wall portion 23A of the first gusset member 27 and the vehicle-width inner wall portion 91 of the reinforcement member 90 are joined to each other by spot welding and the like across a plurality sections s1 (eight sections in this example).

Out of the joining sections s1, a plurality (three sections in this example) of joining sections s1*f* between front edge peripheries 23Aa and 91*a* of the vehicle-width inner wall portion 23A of the first gusset member 27 and the vehicle-width inner wall portion 91 of the reinforcement member 90 are formed along the vertical direction (see FIG. 9 and FIG. 12).

In addition, in the arm front-end supporting portion 20A of this example, as described above, the gusset member 40 of Embodiment 1 (see FIG. 3) is not included on the front side of the squared U-shape portion 21A (see FIG. 9 to FIG. 11), and the extending vehicle-width inner wall portion 26 in the first gusset member 27 is only joined to the vehicle-width inner wall portion 6*a* of the rear side frame 6 (see FIG. 9 and FIG. 12), and is not joined to the lower wall portion 6*c* (lower surface) of the rear side frame 6 (see FIG. 9). Accordingly, in this embodiment, as illustrated in FIG. 11 and FIG. 12, the closed cross section 60*s* in the rear side frame 6 does not include the front-side joint member 71 that receives the bracing load applied to the lower wall portion 6*c* of the rear side frame 6 from the extending vehicle-width inner wall portion 26 and the gusset member 40 described above (see FIG. 5 and FIG. 6), and only includes the middle joint member 72 and the rear-side joint member 73.

In addition, as illustrated in FIG. 9 and FIG. 12, a plurality (two in this example) of first gusset reinforcing beads 45 (45*u* and 45*d*) are arranged in the first gusset member 27 so as to be spaced apart from each other on the upper and lower sides.

Figure 13:
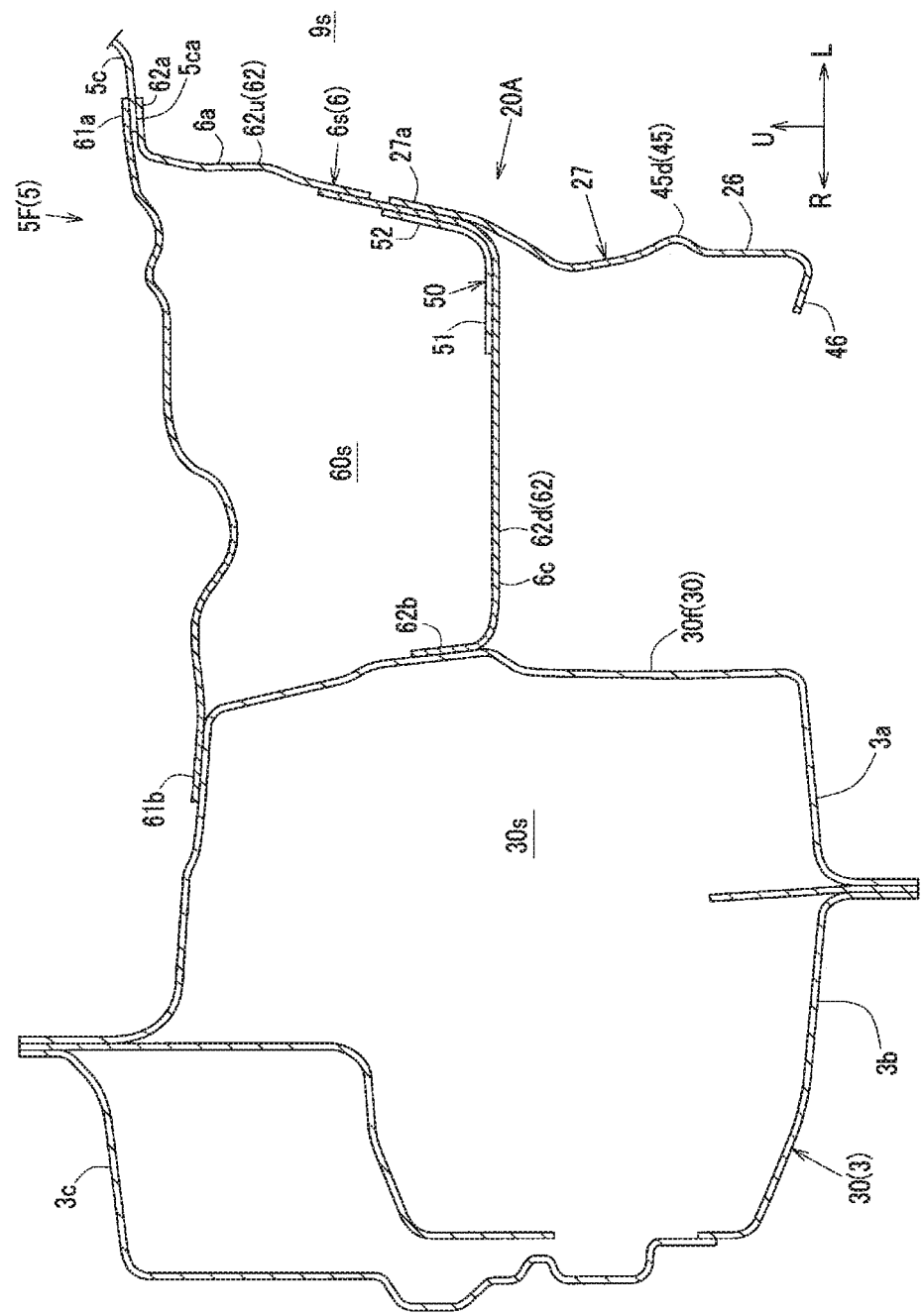
FIG. 13 is a cross-sectional view taken along line C-C in FIG. 2.

The first gusset reinforcing beads 45 on the upper and lower sides are both formed on the inner surface of the first gusset member 27 in the vehicle width in shapes protruding to the inner side in the vehicle width direction (only the first gusset reinforcing bead 45*d* on the lower side is shown in FIG. 13) and extend substantially horizontally and linearly in the vehicle longitudinal direction so as to be parallel to each other (see FIG. 9 and FIG. 12).

Out of the first gusset reinforcing beads 45 on the upper and lower sides, the first gusset reinforcing bead 45*d* on the lower side (hereinafter referred to as the "first gusset lower-side reinforcing bead 45*d*") is formed to be longer than the first gusset reinforcing bead 45*u* on the upper side (hereinafter referred to as the "first gusset upper-side reinforcing bead 45*u*") (see the same figures).

Specifically, the first gusset lower-side reinforcing bead 45*d* is formed to stride over the front wall portion 24A when viewed from the side of the vehicle so that the front end reaches the vehicle-width inner wall portion 23A and the rear end reaches the extending vehicle-width inner wall portion 26.

Note that, in this example, the front end of the first gusset upper-side reinforcing bead 45*u* extends to a position corresponding to the front wall portion 24A in the vehicle-width inner wall portion 23A in the vehicle longitudinal direction when viewed from the side of the vehicle, but the present disclosure is not limited thereto and at least one of the first gusset reinforcing beads 45*u* and 45*d* on the upper and lower sides may be formed to stride over the front wall portion 24A when viewed from the side of the vehicle.

In addition, as illustrated in FIG. 9 to FIG. 11 and FIG. 13, on the lower end of the first gusset member 27, a first gusset reinforcement flange portion 46 bendable toward the outer side in the vehicle width direction is continuously formed in the shape of eaves from the rear end of the vehicle-width inner wall portion 23A to the front end of the extending vehicle-width inner wall portion 26.

As illustrated in FIG. 9, FIG. 11, and FIG. 12, the first gusset reinforcement flange portion 46 formed on the front portion of the extending vehicle-width inner wall portion 26 extends along the lower surface of the inclination portion 6*s* so that the upper surface thereof abuts against the inner end of the lower surface of the inclination portion 6*s* of the rear side frame 6 in the vehicle width direction (in particular, see FIG. 11 and FIG. 12).

As illustrated in FIG. 9 to FIG. 12, substantially the entire second gusset member 28 is formed by the front wall portion 24A, and the second gusset member 28 is formed by a steel plate that extends to the vehicle width direction and the vertical direction.

As illustrated in FIG. 11 and FIG. 12, the second gusset member 28 is formed on the inner end of the front wall portion 24A in the vehicle width direction so that a vehicle-width inner-edge joining flange portion 28*a* extending to the rear side of the vehicle is formed integrally with the front wall portion 24A in a bent manner. The vehicle-width inner-edge joining flange portion 28*a* is joined to the front edge periphery 91*a* of the vehicle-width inner wall portion 91 of the reinforcement member 90 from the outer side in the vehicle width direction by spot welding and the like (see the same figures).

That is, in the joining sections s1*f* described above, three-piece joining of the front edge periphery 23Aa of the vehicle-width inner wall portion 23A of the first gusset member 27, the front edge periphery 91*a* of the vehicle-width inner wall portion 91 of the reinforcement member 90, and the vehicle-width inner-edge joining flange portion 28*a* of the second gusset member 28 (front wall portion 24A) described above is performed by spot welding and the like (in particular, see FIG. 9, FIG. 11, and FIG. 12).

Further, as illustrated in FIG. 9 to FIG. 11, as in the front wall portion 24 of Embodiment 1, in the second gusset member 28, joining flange portions 28*b* and 28*c* extending to the front side of the vehicle are formed integrally with the front wall portion 24A in a bent manner on the outer end and the upper end of the front wall portion 24A in the vehicle width direction.

As illustrated in FIG. 10 and FIG. 11, the joining flange portion 28*b* on the outer end in the vehicle width direction out of the joining flange portions 28*b* and 28*c* is joined to the extending vehicle-width outer wall portion 30*f* in the side sill kick-up portion 30 of the side sill inner portion 3*a* from the inner side in the vehicle width direction.

Now, in this example, as illustrated in FIG. 9 and FIG. 11, a side sill joint member 75 that reinforces the side sill 3 is included in a section corresponding to the second gusset member 28 (front wall portion 24A) in the vehicle longitudinal direction in an inner space 30*s* (closed cross section) of the side sill kick-up portion 30.

As illustrated in FIG. 9, the side sill joint member 75 is integrally formed by a main body portion 75*a* (see FIG. 9 and FIG. 11), a lower-end joining flange portion 75*b*, an upper-end joining flange portion 75*c*, and a vehicle-width inner-end joining flange portion 75*d*. Those joining flange portions 75*b*, 75*c*, and 75*d* are all formed integrally with the main body portion 75*a* in a bent manner so as to extend to the rear side of the vehicle from end portions corresponding to the main body portion 75*a*.

Further, as illustrated in FIG. 9, the lower-end joining flange portion 75*b*, the upper-end joining flange portion 75*c*, and the vehicle-width inner-end joining flange portion 75*d* of the side sill joint member 75 are joined to a lower wall portion 3*ad* (see FIG. 9 and FIG. 11), an upper wall portion 3*au* (see the same figures), and a vehicle width direction inner-wall portion (30*f*) (see the same figures) of the side sill inner portion 3*a*, respectively, from the surface side facing the inner space 30*s* of the side sill kick-up portion 30.

That is, three-piece joining of the vehicle-width inner-end joining flange portion 75*d* of the side sill joint member 75, the vehicle width direction inner-wall portion (30*f*) of the side sill inner portion 3*a*, and the joining flange portion 28*b* on the outer end of the second gusset member 28 in the vehicle width direction is performed by spot welding and the like (see FIG. 9).

As illustrated in FIG. 9 and FIG. 10, in the lower vehicle-body structure of the vehicle of this embodiment described above, the arm front-end supporting portions 20A that support the arm front-end portions 12 serving as the front ends of the trailing arms 11 of the rear suspension 10 are formed on the lower portions of the left and right rear side frames 6 (rear frames) forming the closed cross section 60*s* (see FIG. 11 to FIG. 13) extending in the vehicle longitudinal direction, the squared U-shape portion 21A including the vehicle-width outer wall portion 30*r* (outer wall portion) on the outer side in the vehicle width direction, the vehicle-width inner wall portion 23A (inner wall portion) on the inner side in the vehicle width direction, and the front wall portion 24A with a rear side being open when viewed from the bottom is included in each of the arm front-end supporting portions 20A, the extending vehicle-width outer wall portion 30*f* (extending outer wall portion) extending from the vehicle-width outer wall portion 30*r* to a place in front of the front wall portion 24A is formed in the arm front-end supporting portion 20A, the vehicle-width outer wall portion 30*r* and the extending vehicle-width outer wall portion 30*f* are formed by the side sill inner portion 3*a* joined to the rear side frame 6, and the extending vehicle-width inner wall portion 26 (extending inner wall portion) that extends from the vehicle-width inner wall portion 23A to a place in front of the front wall portion 24A and is joined to the rear side frame 6 is formed (see FIG. 9 to FIG. 13).

According to the configuration described above, the support stiffness of the arm front-end supporting portion 20A that supports the arm front-end portion 12 of the rear suspension 10 can be improved. Therefore, the vibration (input load) input to the vehicle body from the rear wheels via the rear suspension 10 can be effectively reduced in the arm front-end supporting portion 20A serving as the input source of the vibration, thereby being able to contribute to the reduction of the floor vibration.

In addition, in this embodiment, the vehicle-width inner wall portion 23A is formed by the first gusset member 27 (first gusset member), and the front wall portion 24A is formed by the second gusset member 28 (second gusset member). Further, the first gusset member 27 is integrally molded so as to include the extending vehicle-width inner wall portion 26 (see the same figures).

According to the configuration described above, the support stiffness of the arm front-end supporting portion 20A that supports the arm front-end portion 12 of the rear suspension 10 in the vehicle longitudinal direction can be improved more.

In detail, the arm front-end supporting portion 20 of Embodiment 1 is obtained by integrally forming the vehicle-width inner wall portion 23 and the front wall portion 24 included in the arm front-end supporting portion 20 (the squared U-shape portion 21 in the arm front-end supporting portion 20) by the arm front-end supporting bracket 25 formed by one member as described above (in particular, see FIG. 3). According to this configuration, a configuration that is advantageous in terms of particularly suppressing the vibration acting in the vehicle width direction out of the vibration (load) input to the vehicle body from the rear wheels via the rear suspension 10 in the arm front-end supporting portion 20 serving as the input source of the vibration can be obtained.

Meanwhile, the arm front-end supporting portion 20A of Embodiment 2 is obtained by integrally forming the vehicle-width inner wall portion 23A and the extending vehicle-width inner wall portion 26 included in the arm front-end supporting portion 20A by the first gusset member 27 formed by one member as described above (in particular, see FIG. 9 to FIG. 12). As a result, the vibration (load) acting in the vehicle longitudinal direction out of the vibration (load) input to the vehicle body from the rear wheels via the rear suspension 10 can be particularly suppressed in an effective manner in the arm front-end supporting portion 20A serving as the input source of the vibration.

When a torsion beam type (also referred to as a trailing arm type) in which the arm front-end supporting portion 20 (pivot bearing) that supports the trailing arm 11 (swing arm) is arranged on the front side with respect to the rear wheels is employed as the rear suspension 10, as in this embodiment, it has become clear that the input vibration in the vehicle longitudinal direction, in particular, out of the input vibration (input load) from the rear wheels to the arm front-end supporting portion 20 serving as the vibration input point to the vehicle body (load input point) is likely to increase.

Therefore, as in the arm front-end supporting portion 20A of Embodiment 2, by employing a configuration including the first gusset member 27 in which the vehicle-width inner wall portion 23A and the extending vehicle-width inner wall portion 26 that extends frontward from the vehicle-width inner wall portion 23A and is joined to the rear side frame 6 are integrally formed, the arm front-end supporting portion 20A serving as the vibration input point (load input point) can have a configuration that is advantageous against the vibration acting in the vehicle longitudinal direction. Further, the vibration (load) input to the vehicle body from the rear wheels via the rear suspension 10 can be effectively reduced also when the torsion beam type is employed as the rear suspension 10.

In addition, in this embodiment, as illustrated in FIG. 9 to FIG. 13, when the first gusset member 27 is joined to the rear side frame 6, the joining flange portion 27*a* formed on each of the upper ends of the vehicle-width inner wall portion 23A and the extending vehicle-width inner wall portion 26 are joined to the vehicle-width inner wall portion 6*a* of the rear side frame 6 by spot welding and the like.

As a result, when the load in the vehicle longitudinal direction is input to the arm front-end supporting portion 20A, a firm joined state with the rear side frame 6 can be maintained and the total number of spot welding on the rear side frame 6 can be reduced even without joining the first gusset member 27 in which the vehicle-width inner wall portion 23A and the extending vehicle-width inner wall portion 26 are integrally formed to the lower surface of the rear side frame 6 (lower wall portion 6*c*).

Further, in this embodiment, the first gusset member 27 is not joined to the lower surface of the rear side frame 6. Therefore, in a position corresponding to the front end of the first gusset member 27 in the closed cross section 60*s* in the rear side frame 6, joint members for reinforcement such as the front-side joint member 71 (FIG. 5 and FIG. 6) included in Embodiment 1, for example, in order to reinforce a place between the first gusset member 27 and the side sill 3 can also be omitted, thereby enabling the manufacturing cost to be reduced and the weight of the vehicle body to be reduced (see FIG. 11 and FIG. 12).

In addition, in this embodiment, the first gusset lower-side reinforcing bead 45d (first gusset reinforcing bead) is formed from the vehicle-width inner wall portion 23A to the extending vehicle-width inner wall portion 26 of the first gusset member 27 (see FIG. 9, FIG. 12, and FIG. 13).

According to the configuration described above, the stiffness between the vehicle-width inner wall portion 23A and the extending vehicle-width inner wall portion 26 in the first gusset member 27 can be improved. That is, the integrity of the vehicle-width inner wall portion 23A and the extending vehicle-width inner wall portion 26 can be further enhanced.

In addition, in this embodiment, the first gusset reinforcement flange portion 46 bendable outwards in the vehicle width direction is included from the vehicle-width inner wall portion 23A to the extending vehicle-width inner wall portion 26 on the lower end of the first gusset member 27 (see FIG. 9 to FIG. 11 and FIG. 13).

According to the configuration described above, the stiffness of the first gusset member 27 can be improved by forming the first gusset reinforcement flange portion 46 from the vehicle-width inner wall portion 23A to the extending vehicle-width inner wall portion 26 on the lower end of the first gusset member 27.

The present disclosure is not only limited to the configurations of the examples described above, and may be formed by various embodiments.

What is claimed is:

1. A lower vehicle-body structure of a vehicle, the lower vehicle-body structure comprising:
   left and right rear frames forming a closed cross section extending in a vehicle longitudinal direction;
   arm front-end supporting portions that are on lower portions of the rear frames and support left and right trailing arm front ends of a rear suspension, the arm front-end supporting portions each having a squared U-shape portion including an outer wall portion on an outer side in a vehicle width direction, an inner wall portion on an inner side in the vehicle width direction, and a front wall portion, the squared U-shape portion having a rear side being open when viewed from bottom, the inner wall portion being formed by a first gusset member, and the front wall portion being formed by a second gusset member, each of the arm front-end supporting portions including:
      an extending outer wall portion extending from the outer wall portion to a place in front of the front wall portion, the outer wall portion and the extending outer wall portion being formed by a side sill inner portion joined to each of the rear frames; and
      an extending inner wall portion extending from the inner wall portion to a place in front of the front wall portion, the extending inner wall portion being joined to each of the rear frames,
   wherein
   a first gusset reinforcing bead is formed from the inner wall portion of the first gusset member to the extending inner wall portion, and
   the first gusset member is integrally molded so as to include the extending inner wall portion.

2. The lower vehicle-body structure of a vehicle according to claim 1, further comprising:
   a first gusset reinforcement flange portion bendable outward in the vehicle width direction from the inner wall portion to the extending inner wall portion on a lower end of the first gusset member.

3. The lower vehicle-body structure of a vehicle according to claim 1, wherein the extending inner wall portion is formed by a gusset member formed by a member different from the inner wall portion.

4. The lower vehicle-body structure of a vehicle according to claim 3, wherein the gusset member includes:
   an inner-wall extending portion extending frontward from the inner wall portion; and
   a front-wall extending portion that extends frontward from the front wall portion and is continuous with the inner-wall extending portion via a ridgeline.

5. The lower vehicle-body structure of a vehicle according to claim 4, wherein the gusset member includes a reinforcement flange portion bendable downward from an outer end of the front-wall extending portion in the vehicle width direction.

6. The lower vehicle-body structure of a vehicle according to claim 4, wherein the gusset member comprises, on the inner-wall extending portion, a reinforcing bead extending from the inner wall portion to a joining portion to the rear frame.

7. The lower vehicle-body structure of a vehicle according to claim 4, further comprising a rear frame reinforcement in the rear frame, wherein:
   the rear frame reinforcement is formed by:
      a reinforcement lower-wall inner-side portion arranged on an inner side of a lower wall of the rear frame in the vehicle width direction; and
      a reinforcement inner-wall lower-side portion arranged on a lower portion of the inner wall portion; and
   the inner-wall extending portion and the reinforcement inner-wall lower-side portion are joined to each other so as to sandwich the rear frame therebetween, and the front-wall extending portion and the reinforcement lower-wall inner-side portion are joined to each other so as to sandwich the rear frame therebetween.

8. The lower vehicle-body structure of a vehicle according to claim 3, further comprising:
   a joint member in the rear frame, the joint member being at a position close to a front portion of the gusset member.

9. A lower vehicle-body structure of a vehicle, the lower vehicle-body structure comprising:
   left and right rear frames forming a closed cross section extending in a vehicle longitudinal direction;
   arm front-end supporting portions that are on lower portions of the rear frames and support left and right trailing arm front ends of a rear suspension, the arm front-end supporting portions each having a squared U-shape portion including an outer wall portion on an outer side in a vehicle width direction, an inner wall portion on an inner side in the vehicle width direction, and a front wall portion, the squared U-shape portion having a rear side being open when viewed from bottom, the inner wall portion being formed by a first gusset member, and the front wall portion being formed by a second gusset member, each of the arm front-end supporting portions including:
      an extending outer wall portion extending from the outer wall portion to a place in front of the front wall portion, the outer wall portion and the extending outer wall portion being formed by a side sill inner portion joined to each of the rear frames; and
      an extending inner wall portion extending from the inner wall portion to a place in front of the front wall portion, the extending inner wall portion being joined to each of the rear frames; and a first gusset reinforcement flange portion bendable outward in the vehicle width direction from the inner wall portion to the extending inner wall portion on a lower end of the first gusset member, and wherein the first gusset member is integrally molded so as to include the extending inner wall portion.

10. A lower vehicle-body structure of a vehicle, the lower vehicle-body structure comprising:

left and right rear frames forming a closed cross section extending in a vehicle longitudinal direction; and arm front-end supporting portions that are on lower portions of the rear frames and support left and right trailing arm front ends of a rear suspension, the arm front-end supporting portions each having a squared U-shape portion including an outer wall portion on an outer side in a vehicle width direction, an inner wall portion on an inner side in the vehicle width direction, and a front wall portion, the squared U-shape portion having a rear side being open when viewed from bottom, each of the arm front-end supporting portions including:

an extending outer wall portion extending from the outer wall portion to a place in front of the front wall portion, the outer wall portion and the extending outer wall portion being formed by a side sill inner portion joined to each of the rear frames; and an extending inner wall portion extending from the inner wall portion to a place in front of the front wall portion, the extending inner wall portion being joined to each of the rear frames, wherein the front wall portion forms a surface extending in the vehicle width direction at a place below a lower wall portion of a rear side frame of the vehicle, and a joining flange portion that is integrally formed in a bent manner on an upper end of the surface of the front wall portion, the joining flange portion extending to a front side of the vehicle so as to be joined to the lower portion of the rear side frame.

11. The lower vehicle-body structure of a vehicle according to claim 10, wherein:

the inner wall portion is formed by a first gusset member;

the front wall portion is formed by a second gusset member; and the first gusset member is integrally molded so as to include the extending inner wall portion.

12. The lower vehicle-body structure of a vehicle according to claim 11, wherein a first gusset reinforcing bead is formed from the inner wall portion of the first gusset member to the extending inner wall portion.

13. The lower vehicle-body structure of a vehicle according to claim 12, further comprising:

a first gusset reinforcement flange portion bendable outward in the vehicle width direction from the inner wall portion to the extending inner wall portion on a lower end of the first gusset member.

14. The lower vehicle-body structure of a vehicle according to claim 10, wherein the extending inner wall portion is formed by a gusset member formed by a member different from the inner wall portion.

15. The lower vehicle-body structure of a vehicle according to claim 14, wherein the gusset member includes:

an inner-wall extending portion extending frontward from the inner wall portion; and a front-wall extending portion that extends frontward from the front wall portion and is continuous with the inner-wall extending portion via a ridgeline.

16. The lower vehicle-body structure of a vehicle according to claim 15, wherein the gusset member includes a reinforcement flange portion bendable downward from an outer end of the front-wall extending portion in the vehicle width direction.

17. The lower vehicle-body structure of a vehicle according to claim 15, wherein the gusset member comprises, on the inner-wall extending portion, a reinforcing bead extending from the inner wall portion to a joining portion to the rear frame.

18. The lower vehicle-body structure of a vehicle according to claim 15, further comprising a rear frame reinforcement in the rear frame, wherein:

the rear frame reinforcement is formed by:

a reinforcement lower-wall inner-side portion arranged on an inner side of a lower wall of the rear frame in the vehicle width direction; and a reinforcement inner-wall lower-side portion arranged on a lower portion of the inner wall portion; and the inner-wall extending portion and the reinforcement inner-wall lower-side portion are joined to each other so as to sandwich the rear frame therebetween, and the front-wall extending portion and the reinforcement lower-wall inner-side portion are joined to each other so as to sandwich the rear frame therebetween.

19. The lower vehicle-body structure of a vehicle according to claim 14, further comprising:

a joint member in the rear frame, the joint member being at a position close to a front portion of the gusset member.

* * * * *